(12) United States Patent
Yao et al.

(10) Patent No.: US 12,460,054 B2
(45) Date of Patent: Nov. 4, 2025

(54) CELLULOSIC PARTICLE

(71) Applicant: FUJIFILM Business Innovation Corp., Tokyo (JP)

(72) Inventors: Kenji Yao, Kanagawa (JP); Kazusei Yoshida, Kanagawa (JP); Ayu Naito, Kanagawa (JP); Shota Matoba, Kanagawa (JP); Satomi Kashiwagi, Kanagawa (JP); Yuko Iwadate, Kanagawa (JP); Masahiro Oki, Kanagawa (JP); Takahiro Ishizuka, Kanagawa (JP); Takeshi Iwanaga, Kanagawa (JP); Hideaki Yoshikawa, Kanagawa (JP); Tetsuya Taguchi, Kanagawa (JP); Hirokazu Hamano, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/366,674

(22) Filed: Aug. 7, 2023

(65) Prior Publication Data
US 2024/0262967 A1   Aug. 8, 2024

(30) Foreign Application Priority Data
Feb. 3, 2023 (JP) ................. 2023-015492

(51) Int. Cl.
| | |
|---|---|
| C08J 3/12 | (2006.01) |
| C08J 7/04 | (2020.01) |
| C08K 3/22 | (2006.01) |
| C08K 3/26 | (2006.01) |
| C08K 5/098 | (2006.01) |
| C08K 5/17 | (2006.01) |
| C08L 1/02 | (2006.01) |
| C08L 1/10 | (2006.01) |

(52) U.S. Cl.
CPC ............ *C08J 3/128* (2013.01); *C08J 7/04* (2013.01); *C08K 3/22* (2013.01); *C08K 3/26* (2013.01); *C08K 5/098* (2013.01); *C08K 5/175* (2013.01); *C08L 1/02* (2013.01); *C08L 1/10* (2013.01); *C08K 2003/265* (2013.01)

(58) Field of Classification Search
CPC ... C08J 3/126–128; C08J 2301/12; C08L 1/02
See application file for complete search history.

(56) References Cited

U.S. PATENT DOCUMENTS

| | | | | |
|---|---|---|---|---|
| 2004/0043964 A1* | 3/2004 | Gomi | ............ | C08B 16/00 424/494 |
| 2008/0003444 A1* | 1/2008 | Oya | ............ | B29C 55/08 536/56 |

FOREIGN PATENT DOCUMENTS

| | | | |
|---|---|---|---|
| EP | 3943530 | 1/2022 | |
| EP | 4223273 | 8/2023 | |
| EP | 4269472 | 11/2023 | |
| JP | 2020132616 | 8/2020 | |
| JP | 6872068 B1 * | 5/2021 | ......... A61K 8/0245 |
| JP | 2022099605 | 7/2022 | |
| WO | WO-2013166385 A1 * | 11/2013 | ............ A61K 31/12 |
| WO | 2021230284 | 11/2021 | |

OTHER PUBLICATIONS

Machine translation JP-6872068-B1 (Year: 2024).*
"Search Report of Europe Counterpart Application", issued on Jan. 24, 2024, p. 1-p. 9.
"Office Action of Europe Counterpart Application", issued on Feb. 11, 2025, p. 1-p. 8.

* cited by examiner

*Primary Examiner* — Alexandre F Ferre
(74) *Attorney, Agent, or Firm* — JCIPRNET

(57) ABSTRACT

A cellulosic particle contains cellulose as its base constituent, and the intensity of sodium fluorescent x-rays from the cellulosic particle measured by x-ray fluorescence analysis is 0.015 kps or more and 0.1 kps or less.

12 Claims, No Drawings

CELLULOSIC PARTICLE

CROSS-REFERENCE TO RELATED APPLICATIONS

This application is based on and claims priority under 35 USC 119 from Japanese Patent Application No. 2023-015492 filed Feb. 3, 2023.

BACKGROUND

(i) Technical Field

The present disclosure relates to a cellulosic particle.

(ii) Related Art

In Japanese Unexamined Patent Application Publication No. 2022-099605, "resin beads obtained by surface treatment of core beads formed from a resin having cellulose as a main component by a solid surface treatment agent, in which the volume-based cumulative 50% particle size is 50 µm or less, the sphericity is 0.7-1.0, the surface smoothness is 70-100%, and the degree of crystallization is 60% or less." are proposed.

In Japanese Unexamined Patent Application Publication No. 2020-132616, "oily solid cosmetics containing surface-treated spherical cellulose powder with an average particle size of 1.0-30.0 µm." is proposed.

SUMMARY

Aspects of non-limiting embodiments of the present disclosure relate to a cellulosic particle that, in the context of cellulosic particles containing cellulose as their base constituent, may exhibit improved dispersibility in a dispersion containing the cellulosic particles compared with if the intensity of sodium fluorescent x-rays from the cellulosic particle measured by x-ray fluorescence analysis is less than 0.015 kps or more than 0.1 kps.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a cellulosic particle containing cellulose as a base constituent, wherein an intensity of sodium fluorescent x-rays measured by x-ray fluorescence analysis is 0.015 kps or more and 0.1 kps or less.

DETAILED DESCRIPTION

Exemplary embodiments as examples of the present disclosure will now be described. These descriptions and the Examples are intended to illustrate exemplary embodiments and not intended to limit the scope of aspects of the present disclosure.

In a series of numerical ranges presented herein, an upper or lower limit specified in one numerical range may be substituted with the upper or lower limit of another numerical range in the same series. In a numerical range presented herein, furthermore, the upper or lower limit of the numerical range may be substituted with a value indicated in the Examples.

A constituent may include multiple corresponding substances.

When the amount of a constituent in a composition is mentioned herein, and if multiple substances corresponding to the constituent are present in the composition, the mentioned amount represents the total amount of the multiple substances present in the composition unless stated otherwise.

"Step" refers not only to an independent step; even if a step cannot be clearly distinguished from another, the step is included in this term as long as its intended action is achieved.

Cellulosic Particles

Cellulosic particles according to an exemplary embodiment contain cellulose as their base constituent, and the intensity of sodium fluorescent x-rays from the cellulosic particles measured by x-ray fluorescence analysis is 0.015 kps or more and 0.1 kps or less.

Configured as described above, the cellulosic particles according to this exemplary embodiment may exhibit improved dispersibility in a dispersion containing the cellulosic particles. Possible reasons are as follows.

Cellulosic particles containing cellulose as their base constituent tend to have many exposed hydroxyl groups on their particle surface, and these hydroxyl groups can be likely to undergo hydrogen bonding. In such a case the cellulosic particles can be likely to aggregate, and can be likely to exhibit reduced dispersibility, in a dispersion.

For the cellulosic particles according to this exemplary embodiment, the intensity of sodium fluorescent x-rays measured by x-ray fluorescence analysis is 0.015 kps or more and 0.1 kps or less. In this configuration, it may be likely that sodium ions are present on the surface of the cellulosic particles. In such a case, ionic repulsion between the sodium ions may be caused, and it may be likely that repulsive forces act between the cellulosic particles.

If the intensity of sodium fluorescent x-rays measured by x-ray fluorescence analysis is less than 0.015 kps, it is unlikely that repulsive forces act between the cellulosic particles because in that case the quantity of sodium ions present on the surface is small. If the intensity of sodium fluorescent x-rays measured by x-ray fluorescence analysis is more than 0.1 kps, the quantity of sodium ions present on the surface is large, and the biodegradability of the cellulosic particles is likely to be low.

For these reasons, presumably, the cellulosic particles according to this exemplary embodiment may exhibit improved dispersibility in a dispersion containing the cellulosic particles.

Constituents of the Cellulosic Particles

Cellulose

The cellulosic particles according to this exemplary embodiment contain cellulose as their base constituent.

In this context, containing cellulose as a base constituent means that the amount of cellulose relative to the cellulosic particles is 90% by mass or more.

When the cellulosic particles have the coating and intermediate layers described later herein, containing cellulose as a base constituent means that the cellulose content relative to the core particle is 90% by mass or more.

The number-average molecular weight of the cellulose may be 37000 or more, preferably 45000 or more.

There is no particular upper limit, but for example, the number-average molecular weight of the cellulose may be 100000 or less.

By setting the number-average molecular weight of the cellulose to 37000 or more, it may be likely that the number of hydroxyl groups exposed on the surface of the cellulosic particles is small. It may be, therefore, likely that dispersibility in a dispersion is improved. By setting the number-average molecular weight of the cellulose to 45000 or more, it may be more likely that the number of hydroxyl groups exposed on the surface of the cellulosic particles is small. It may be, therefore, more likely that dispersibility in a dispersion is improved.

The number-average molecular weight of the cellulose is measured by gel permeation chromatography (differential refractometer, Optilab T-rEX, Wyatt Technology; multiangle light scattering detector, DAWN HELEOS II, Wyatt Technology; columns, one TSKgel α-M and one α-3000, Tosoh) with dimethylacetamide (with the addition of 0.1 M lithium chloride) as the eluent.

Extra Constituents

The cellulosic particles according to this exemplary embodiment may contain extra constituents. If the cellulosic particles have the coating layer described later herein, the extra constituents are contained in the core particle, which is covered with the coating layer.

Examples of extra constituents include plasticizers, flame retardants, compatibilizers, release agents, light stabilizers, weathering agents, coloring agents, pigments, modifiers, anti-dripping agents, antistatic agents, anti-hydrolysis agents, fillers, reinforcing agents (glass fiber, carbon fiber, talc, clay, mica, glass flakes, milled glass, glass beads, crystalline silica, alumina, silicon nitride, aluminum nitride, boron nitride, etc.), acid acceptors for preventing acetic acid release (oxides, such as magnesium oxide and aluminum oxide; metal hydroxides, such as magnesium hydroxide, calcium hydroxide, aluminum hydroxide, and hydrotalcite; calcium carbonate; talc; etc.), and reactive trapping agents (e.g., epoxy compounds, acid anhydride compounds, carbodiimides, etc.).

The amounts of the extra constituents may be 0% by mass or more and 5% by mass or less for each constituent in relation to the total amount of the cellulosic particles (or core particles). In this context, "0% by mass" means that the extra constituent is not contained.

Intensity of Sodium Fluorescent X-Rays

For the cellulosic particles according to this exemplary embodiment, the intensity of sodium fluorescent x-rays measured by x-ray fluorescence analysis is 0.015 kps or more and 0.1 kps or less and may be 0.015 kps or more and 0.07 kps or less, preferably 0.02 kps or more and 0.06 kps or less, more preferably 0.03 kps or more and 0.04 kps or less for dispersibility reasons.

Procedure for the Measurement of the Intensity of Sodium Fluorescent X-Rays

For the measurement of the intensity of sodium fluorescent x-rays, it is measured using an x-ray fluorescence analyzer. An example of an x-ray fluorescence analyzer that can be used is HORIBA's MESA-50.

The measurement of the intensity of sodium fluorescent x-rays is as follows.

By pressing the cellulosic particles of interest, a disk-shaped measurement sample having a diameter of 10 mm and a thickness of 2 mm is formed. Then the intensity of sodium fluorescent x-rays from the measurement sample is measured using an x-ray fluorescence analyzer.

Intensity of Chlorine Fluorescent X-Rays For the cellulosic particles according to this exemplary embodiment, the intensity of chlorine fluorescent x-rays measured by x-ray fluorescence analysis may be 0.003 kps or more and 0.08 kps or less, preferably 0.03 kps or more and 0.07 kps or less, more preferably 0.04 kps or more and 0.05 kps or less.

By making the intensity of chlorine fluorescent x-rays 0.003 kps or more and 0.08 kps or less, chloride ions may be allowed to coexist on the surface of the cellulosic particles together with sodium ions. Through the coexistence, interactions between ions of the same type may decrease, and aggregation between cellulosic particles may be reduced. As a result, the dispersibility of the cellulosic particles in a dispersion may improve.

Procedure for the Measurement of the Intensity of Chlorine Fluorescent X-Rays

For the procedure for the measurement of the intensity of chlorine fluorescent x-rays, it is measured through the same procedure as the "—Procedure for the Measurement of the Intensity of Sodium Fluorescent X-Rays" described above, except that the intensity of chlorine fluorescent x-rays is measured using an x-ray fluorescence analyzer rather than the intensity of sodium fluorescent x-rays.

Intensity of Sulfur Fluorescent X-Rays

For the cellulosic particles according to this exemplary embodiment, the intensity of sulfur fluorescent x-rays measured by x-ray fluorescence analysis may be 0.01 kps or more and 0.05 kps or less, preferably 0.01 kps or more and 0.04 kps or less, more preferably 0.02 kps or more and 0.035 kps or less.

By making the intensity of sulfur fluorescent x-rays measured by x-ray fluorescence analysis 0.01 kps or more and 0.05 kps or less, ions containing sulfur may be allowed to coexist on the surface of the cellulosic particles together with sodium ions. Through the coexistence, interactions between ions of the same type may decrease, and aggregation between cellulosic particles may be reduced. As a result, the dispersibility of the cellulosic particles in a dispersion may improve.

Procedure for the Measurement of the Intensity of Sulfur Fluorescent X-Rays

For the procedure for the measurement of the intensity of sulfur fluorescent x-rays, it is measured through the same procedure as the "—Procedure for the Measurement of the Intensity of Sodium Fluorescent X-Rays" described above, except that the intensity of sulfur fluorescent x-rays is measured using an x-ray fluorescence analyzer rather than the intensity of sodium fluorescent x-rays.

Intensity of Calcium Fluorescent X-Rays

For the cellulosic particles according to this exemplary embodiment, the intensity of calcium fluorescent x-rays measured by x-ray fluorescence analysis may be 2 kps or more and 30 kps or less, preferably 5 kps or more and 25 kps or less, more preferably 20 kps or more and 25 kps or less.

By making the intensity of calcium fluorescent x-rays measured by x-ray fluorescence analysis 2 kps or more and 30 kps or less, calcium ions may be allowed to coexist on the surface of the cellulosic particles together with sodium ions. Through the coexistence, interactions between ions of the same type may decrease, and aggregation between cellulosic particles may be reduced. As a result, the dispersibility of the cellulosic particles in a dispersion may improve.

Procedure for the Measurement of the Intensity of Calcium Fluorescent X-Rays

For the procedure for the measurement of the intensity of calcium fluorescent x-rays, it is measured through the same procedure as the "—Procedure for the Measurement of the Intensity of Sodium Fluorescent X-Rays" described above, except that the intensity of calcium fluorescent x-rays is measured using an x-ray fluorescence analyzer rather than the intensity of sodium fluorescent x-rays.

Cellulosic Particles Having a Coating Layer

The cellulosic particles according to this exemplary embodiment may be cellulosic particles having a core particle that contains cellulose as its base constituent (hereinafter also referred to as a cellulosic core particle) and a coating layer that covers the core particle and contains at least one selected from the group consisting of a fatty acid, a fatty acid metallic salt, and an amino acid compound (hereinafter also referred to as "cellulosic particles having a coating layer").

In this configuration, the cellulosic particles according to this exemplary embodiment may have a reduced number of exposed hydroxyl groups on their surface. As a result, aggregation between cellulosic particles may be reduced, and the dispersibility of the cellulosic particles in a dispersion may improve.

Core Particle

The core particle contains cellulose as its base constituent.

The cellulose contained in the core particle is synonymous with the cellulose described above, and possible and preferred ranges are also the same as described above.

Coating Layer

The coating layer contains at least one selected from the group consisting of a fatty acid, a fatty acid metallic salt, and an amino acid compound.

Fatty Acid

A fatty acid is a linear-chain or branched saturated or unsaturated fatty acid. The fatty acid may be a mixture of a saturated fatty acid and an unsaturated fatty acid.

The fatty acid may be a fatty acid having 16 or more and 22 or fewer carbon atoms (C16 to C22; preferably a C18 to C20 fatty acid). Specific examples of C16 to C22 linear-chain fatty acids include behenic acid, arachidic acid, and palmitic acid.

The amount of the fatty acid may be 2% by mass or more and 15% by mass or less, preferably 5% by mass or more and 10% by mass or less, of the cellulosic particles as a whole.

By using a C16 to C22 fatty acid as the fatty acid, it may be easier to cover the surface of the core particle. As a result, it may be more likely that the number of hydroxyl groups exposed on the surface of the cellulosic particles is small.

Fatty Acid Metallic Salt

A fatty acid metallic salt is a linear-chain or branched saturated or unsaturated fatty acid metallic salt. The fatty acid metallic salt may be a mixture of a saturated fatty acid metallic salt and an unsaturated fatty acid metallic salt.

Examples of fatty acid metallic salts include metallic salts of C16 to C22 (preferably C18 to C20) fatty acids. Examples of metallic salts of C16 to C22 fatty acids include metallic salts of stearic acid, metallic salts of behenic acid, and metallic salts of palmitic acid.

An example of a metal in a fatty acid metallic salt is a divalent metal.

Examples of metals in linear-chain fatty acid metallic salts include magnesium, calcium, aluminum, barium, and zinc.

The amount of the fatty acid metallic salt may be 2% by mass or more and 15% by mass or less, preferably 5% by mass or more and 10% by mass or less, of the cellulosic particles as a whole.

The number of carbon atoms in the fatty acid may be 16 or more and 22 or fewer, and the number of carbon atoms in the fatty acid metallic salt may be 16 or more and 22 or fewer.

By using C16 to C22 compounds as the fatty acid and the fatty acid metallic salt, it may be easier to cover the surface of the core particle. As a result, it may be more likely that the number of hydroxyl groups exposed on the surface of the cellulosic particles is small.

The fatty acid may be a saturated fatty acid, and the fatty acid metallic salt may be a saturated fatty acid metallic salt.

When the fatty acid and fatty acid metallic salt are a saturated fatty acid and a saturated fatty acid metallic salt, the cellulosic particles may be unlikely to aggregate because in that case interactions working between unsaturated bonds may be reduced.

Amino Acid Compound

"Amino acid compounds" refers to amino acids and amino acid derivatives.

Examples of amino acid compounds include lauryl leucine, lauryl arginine, and myristyl leucine.

The amount of the amino acid compound may be 2% by mass or more and 10% by mass or less of the cellulosic particles as a whole.

Cellulosic particles having a coating layer may have an intermediate layer between the core particle and the coating layer. The intermediate layer, furthermore, may contain at least one selected from the group consisting of a polyamine compound, a polyquaternium, a polysaccharide compound, and a polyacrylic acid.

When the cellulosic particles have an intermediate layer, it may be more likely that the number of hydroxyl groups exposed on the surface of the cellulosic particles is small by virtue of its interactions with the coating layer. As a result, the dispersibility of the cellulosic particles may improve.

"Polyamine compound" is a generic term for aliphatic hydrocarbons having two or more primary amino groups.

Examples of polyamine compounds include a polyalkyleneimine, polyallylamine, polyvinylamine, and polylysine.

The polyalkyleneimine may be a polyalkyleneimine possessing a constituent unit having a C1 to C6 (preferably C1 to C4, more preferably C1 or C2), preferably polyethyleneimine, for improved biodegradability.

Examples of polyallylamines include homopolymers or copolymers of allylamine, allylamine amidosulfate, diallylamine, dimethylallylamine, etc.

Examples of polyvinylamines include polyvinylamines manufactured by hydrolyzing poly(N-vinylformamide) with an alkali, and a specific example is Mitsubishi Chemical's "PVAM-0595B."

The polylysine may be polylysine extracted from a natural substance, may be polylysine produced by a transformed microorganism, or may be chemically synthesized polylysine.

The amount of the polyamine compound may be 0.2% by mass or more and 2% by mass or less of the cellulosic particles as a whole.

Examples of polyquaterniums include polyquaternium-6, polyquaternium-7, polyquaternium-10, polyquaternium-11, polyquaternium-51, polyquaternium-61, and polyquaternium-64.

The amount of the polyquaternium may be 0.2% by mass or more and 2% by mass or less of the cellulosic particles as a whole.

The amount of the polyacrylic acid may be 0.2% by mass or more and 2% by mass or less of the cellulosic particles as a whole.

Amounts of Constituents in the Coating and Intermediate Layers

The total amount of the fatty acid, fatty acid metallic salt, and amino acid compound relative to the entire coating layer may be 90% by mass or more and 100% by mass or less, preferably 95% by mass or more and 100% by mass or less.

The total amount of the polyamine compound, polyquaternium, polysaccharide compound, and polyacrylic acid relative to the entire intermediate layer may be 90% by mass or more and 100% by mass or less, preferably 95% by mass or more and 100% by mass or less.

External Additive

The cellulosic particles according to this exemplary embodiment may have inorganic particles as an external additive. Inorganic particles tend to be likely to repel each other because of repulsive forces therebetween. When the cellulosic particles have inorganic particles as an external additive, therefore, the dispersibility of the cellulosic particles may improve.

An example of an external additive is at least one selected from the group consisting of silicon-containing compound particles and metal oxide particles.

"Silicon-containing compound particles" indicates particles containing silicon.

The silicon-containing compound particles may be particles of silicon or may be particles containing silicon and one or more other elements.

The silicon-containing compound particles may be silica particles. The silica particles can be any particles containing silica, or $SiO_2$, as their base constituent and may be crystalline or amorphous. The silica particles, furthermore, may be particles manufactured from a silicon compound, such as waterglass or an alkoxysilane, as a raw material or may be particles obtained by crushing quartz.

As for metal oxides, oxides of metals other than silicon can be applied.

Examples of metal oxides include zinc oxide, magnesium oxide, iron oxide, and aluminum oxide.

The volume-average particle diameter of the external additive may be 1 nm or more and 100 nm or less, preferably 5 nm or more and 30 nm or less, for texture (specifically, feel when touched) reasons.

The volume-average particle diameter of the external additive is measured in the same manner as the volume-average particle diameter of the cellulose.

The amount of the external additive may be 0.1% by mass or more and 2% by mass or less of the mass of the cellulosic particles (the cellulosic particles without the external additive on them) as a whole.

Volume-Average Particle Diameter and Upper Geometric Standard Deviation by Number GSDv The volume-average particle diameter of the cellulosic particles according to this exemplary embodiment may be 3 μm or more and less than 10 μm, preferably 4 μm or more and 9 μm or less, more preferably 5 μm or more and 8 μm or less.

When the volume-average particle diameter is 3 μm or more, secondary aggregation of the particles may be unlikely to occur, and coating unevenness may tend to be reduced.

When the volume-average particle diameter is less than 10 μm, local aggregations, even if they occur, do not occupy a large volume as a whole, it may be possible to compensate for them with portions without aggregation, and coating unevenness may be unlikely to occur. By virtue of a moderately large surface area, furthermore, biodegradation, which starts at the surface, may be likely to progress uniformly, and biodegradability may tend to be excellent.

The upper geometric standard deviation by number GSDv of the cellulosic particles according to this exemplary embodiment may be 1.0 or greater and 1.7 or less, preferably 1.0 or greater and 1.5 or less, more preferably 1.0 or greater and 1.3 or less.

When the GSDv is 1.0 or greater and 1.7 or less, secondary aggregation may be unlikely to occur because the amount of extremely fine or extremely coarse particles may be small, and local secondary aggregations, even if they occur, may tend to be unlikely to have negative impact on coating unevenness because they do not grow to large volumes.

The inhibition of biodegradation (which starts at the surface) by coarse particles (large particles greater than 10 μm) may also be unlikely to occur.

The volume-average particle diameter and the upper geometric standard deviation GSDv of the cellulosic particles are measured as follows.

Particle diameters are measured using the LS particle size distribution analyzer "Beckman Coulter LS13 320 (Beckman Coulter)," and the cumulative distribution of particle diameters is plotted as a function of volume starting from the smallest diameter; then the particle diameter at which the cumulative percentage is 50% is determined as the volume-average particle diameter.

Separately, the cumulative distribution of particle diameters is plotted as a function of volume starting from the smallest diameter; the particle diameter at which the cumulative percentage is 50% is defined as the number-average particle diameter, D50v, and the particle diameter at which the cumulative percentage is 84% is defined as particle diameter D84v by number. The upper geometric standard deviation by number GSDv is calculated according to the equation $GSDv=(D84v/D50v)^{1/2}$.

The sphericity of the cellulosic particles according to this exemplary embodiment may be 0.7 or greater, preferably 0.8 or greater, more preferably 0.9 or greater.

When the sphericity is 0.7 or greater, there may be few flat surfaces; thus, aggregation caused by cellulosic hydrogen bonding forces may be unlikely to occur, and coating unevenness may tend to be good. Decomposition by microorganisms, furthermore, may proceed along the most efficient path, from the surface toward the inner core, and biodegradability may tend to be excellent.

Sphericity is given by (circumference of the equivalent circle)/(circumference) [(circumference of a circle having the same projected area as the particle's image)/(circumference of the particle's projected image)]. Specifically, sphericity is a value measured by the following method.

First, the cellulosic particles of interest are sampled by aspiration in such a manner that the sample will form a flat stream, and this flat stream is photographed with a flash to capture the figures of the particles in a still image; then the sphericity is determined by analyzing the particle images using a flow particle-image analyzer (Sysmex Corp. FPIA-3000). The number of particles sampled in determining the sphericity is 3500.

If the cellulosic particles have an external additive, the cellulosic particles of interest are dispersed in water containing a surfactant, then the dispersion is sonicated to give cellulosic particles from which the external additive has been removed, and the resulting cellulosic particles are used as the subject of measurement.

Surface Smoothness

The surface smoothness of the cellulosic particles according to this exemplary embodiment may be 50% or more, preferably 60% or more and 99% or less, more preferably 70% or more and 98% or less.

When the smoothness is 50% or more, aggregation caused by hydrogen bonding forces of cellulose may be unlikely to occur by virtue of a small specific surface area, and coating unevenness may tend to be better. Biodegradability, furthermore, may tend to be excellent; biodegrading microorganisms include species relatively large in size, and the particle surface in that case may be accessible even to such large microorganisms.

The surface smoothness is measured through a procedure as described below.

An SEM image (magnification, 5,000 times) of the cellulosic particles, taken with a scanning electron microscope (SEM), is observed, and the smoothness M of the individual cellulosic particles is calculated according to the equation below. The arithmetic mean of the smoothness values M of ten or more randomly chosen cellulosic particles is reported as the surface smoothness. The closer the value of the smoothness M is to 1, the closer the surface of the cellulosic particles is to smoothness.

$$M=(1-(S3)/(S2))\times 100$$

In this equation, S2 indicates the area that the cellulosic particle occupies in the image (projected area), and S3 indicates, when the cellulosic particle in the image and a circle having a projected area equal to S2 are superimposed, the sum of "the area outside the outline of the circle having a projected area equal to S2 and inside the outline of the cellulosic particle in the image" and "the area inside the outline of the circle having a projected area equal to S2 and outside the outline of the cellulosic particle in the image."

The method for superimposing the cellulosic particle in the image and a circle having a projected area equal to S2 is as follows.

The superposition is carried out in such a manner that when the cellulosic particle in the image and the circle having a projected area equal to S2 are superimposed, the area of the region shared by the two images (the area inside the outline of the circle having a projected area equal to S2 and inside the outline of the cellulosic particle in the image) is maximized.

Method for Manufacturing the Cellulosic Particles

An example of a method for manufacturing the cellulosic particles according to this exemplary embodiment is as follows.

Cellulosic Particle (core particle) Production Step
 (1) First, cellulose acylate solution A is prepared by dissolving a cellulose acylate in water-dissolving organic solvent A.
 (2) Then cellulose acylate solution B is prepared by adding cellulose acylate solution A into a calcium carbonate dispersion, in which calcium carbonate has been dispersed in water, and stirring the resulting mixture.
 (3) Then cellulose acylate solution C is prepared by adding cellulose acylate solution B to a mixed solution of carboxymethylcellulose, water-dissolving organic solvent B, and water and rapidly stirring the resulting mixture.
 (4) Then sodium hydroxide is added to cellulose acylate solution C. Subsequently, cellulose acylate dispersion C is heated to remove water-dissolving organic solvents A and B. and hydrochloric acid is added to cause the formation of cellulose acylate particles. Then the cellulose acylate particles are isolated by filtration, and the isolated cellulose acylate particles are dispersed in water; in this manner, a cellulose acylate particle dispersion is prepared.
 (5) Then a cellulosic particle suspension is prepared by adding sodium hydroxide to the cellulose acylate particle dispersion and subsequently saponifying the cellulose acylate particles by warming the cellulose acylate particle dispersion in a weakly alkaline environment with stirring.
 (6) Then the pH of the cellulosic particle suspension is adjusted to near neutral (e.g., 6.5 or higher and 7 or lower) by adding hydrochloric acid to the suspension, and subsequently isolation by filtration and washing in purified water of the cellulosic particles are repeated. After the electrical conductivity of the filtrate reaches 10 μs/cm or less, the isolated cellulosic particles are dried.

The intensity of sodium fluorescent x-rays can be adjusted by controlling, in the above manufacturing process, the stirring time and the amount of sodium hydroxide added in (4) and (5).

The intensity of chlorine fluorescent x-rays can be adjusted by controlling the amount of hydrochloric acid added in (4).

The intensity of sulfur fluorescent x-rays can be adjusted by changing the type of cellulose acylate used as a raw material.

The intensity of calcium fluorescent x-rays can be adjusted by controlling the amount of calcium carbonate added in (2).

In the foregoing, a cellulose acylate is a cellulose derivative in which at least one of the hydroxy groups of cellulose has been replaced with an aliphatic acyl group (acylated). Specifically, a cellulose acylate is a cellulose derivative in which at least one of the hydroxy groups of cellulose has been replaced with —CO-$R^{AC}$ ($R^{AC}$ represents an aliphatic hydrocarbon group).

Water-dissolving organic solvent A is a solvent in which 0.1% by mass or more and 10% by mass or less, in relation to the solvent, of water dissolves at 25° C., and examples include ethyl acetate and butyl acetate.

Water-dissolving organic solvent B is a solvent in which 0.1% by mass or more and 10% by mass or less, in relation to the solvent, of water dissolves at 25° C., and examples include methyl ethyl ketone and acetone.

Intermediate Layer and Coating Layer Formation Step

If cellulosic particles having a coating layer are manufactured, a step of forming the coating layer (coating layer formation step) may be included after the above cellulosic particle (core particle) production step.

If the coating layer formation step is carried out, the coating layer is formed using the particles obtained through the above cellulosic particle (core particle) production step as the core particles.

First, an aqueous dispersion in which the core particles have been dispersed is prepared. Before preparing the aqueous dispersion, the core particles may be cleaned with an acid.

Then the aqueous dispersion in which the core particles have been dispersed and an aqueous solution containing the compound that will form the intermediate layer are mixed together. Through that, the intermediate layer is formed, for example as a result of reaction between hydroxyl groups in the resin contained in the core particles and amine sites, carboxyl groups, amino groups, or any other moiety of the compound that will form the intermediate layer or as a result of hydrogen bonding between hydroxyl groups. Then the aqueous dispersion in which the core particles with the intermediate layer formed thereon are dispersed and an emulsion containing the compound that will form the coating layer are mixed together. Through that, the coating layer is formed.

If no intermediate layer is formed, the coating layer is formed by mixing together an aqueous dispersion in which the core particles obtained through the above cellulosic particle (core particle) production step have been dispersed and an emulsion containing the compound that will form the coating layer.

Then, from the mixture, the cellulosic particles having a coating layer are removed. The removal of the cellulosic particles having a coating layer is performed by, for example, filtering the mixture. The removed cellulosic particles having a coating layer may be washed with water. Through that, unreacted surface-treating polymers can be eliminated. Then, by drying the cellulosic particles having a coating layer, cellulosic particles according to this exemplary embodiment are obtained.

Addition Step

To the resulting cellulosic particles, an external additive may be added.

An example of an addition step is a treatment in which the external additive is added to the cellulosic particles using equipment like a mixing mill, V-blender, Henschel mixer, or Lödige mixer.

Applications

Applications of the cellulosic particles according to this exemplary embodiment include granular materials for use as cosmetics, a rolling agent, an abrasive, a scrubbing agent, display spacers, a material for bead molding, light-diffusing particles, a resin-strengthening agent, a refractive index control agent, a biodegradation accelerator, a fertilizer, water-absorbent particles, toner particles, and anti-blocking particles.

An application of the cellulosic particles according to this exemplary embodiment may be cosmetics.

In particular, an application of the cellulosic particles according to this exemplary embodiment may be a cosmetic additive.

The cellulosic particles according to this exemplary embodiment may be superior in flexibility; when they are used as a cosmetic additive, therefore, it may be likely that the spreading and hardness of the cosmetic on the skin to which the cosmetic is applied are good.

The cellulosic particles according to this exemplary embodiment can be applied as cosmetic additives, for example to base makeup cosmetics (e.g., foundation primer, concealer, foundation, and face powder); makeup cosmetics (e.g., lipstick, lip gloss, lip liner, blusher, eyeshadow, eyeliner, mascara, eyebrow powder, nail products, and nail care cosmetics); and skincare cosmetics (e.g., face wash, facial cleanser, toner, milky lotion, serum, face packs, face masks, and cosmetics for the care of the eye and mouth areas).

In particular, the resin particles according to this exemplary embodiment may be used as a cosmetic additive to makeup cosmetics because flexibility and biodegradability may be required in such an application.

EXAMPLES

Examples will now be described, but no aspect of the present disclosure is limited to these examples. In the following description, "parts" and "%" are all by mass unless stated otherwise.

Preparation of Materials

The following materials are prepared.

Cellulose Acylates

CA-1: Daicel Corporation's "L50," diacetyl cellulose, weight-average molecular weight=8,000

CA-2: Daicel Corporation's "L20," diacetyl cellulose, weight-average molecular weight=47,000

CA-3: Eastman Chemical "CAP482-20," cellulose acetate propionate, weight-average molecular weight=75,000

CA-4: Eastman Chemical "CAB381-20," cellulose acetate butyrate, weight-average molecular weight=70,000

CA-5: Eastman Chemical "CA398-6," diacetyl cellulose, weight-average molecular weight=35,000

CA-6: Eastman Chemical "CAP504-0.2," cellulose acetate propionate, weight-average molecular weight=19,000

CA-7: Eastman Chemical "CAB171-15," cellulose acetate butyrate, weight-average molecular weight=55,000

Coating Layer Formation Materials

Fatty Acids

ST-1: NOF Corporation's "NAA-222S," behenic acid (saturated fatty acid), the number of carbon atoms=22

ST-2: NOF Corporation's "NAA-180," stearic acid (saturated fatty acid), the number of carbon atoms=18

ST-3: Miyoshi Oil & Fat Co., Ltd.'s "Palmitic Acid 98," palmitic acid (saturated fatty acid), the number of carbon atoms=16

ST-4: NOF Corporation's "NAA-142," myristic acid (saturated fatty acid), the number of carbon atoms=14

ST-5: Tokyo Chemical Industry Co., Ltd.'s "Lignoceric Acid," lignoceric acid (saturated fatty acid), the number of carbon atoms=24

ST-6: NOF Corporation's "EXTRA OS-85," oleic acid (unsaturated fatty acid with a degree of unsaturation of 1), the number of carbon atoms=18

ST-7: NOF Corporation's "Linoleic Acid 90," linoleic acid (unsaturated fatty acid with a degree of unsaturation of 2), the number of carbon atoms=18

Fatty Acid Metallic Salts

ST-8: NOF Corporation's "CALCIUM STEARATE VEGETABLE," calcium stearate (saturated fatty acid metallic salt), the number of carbon atoms=18

ST-9: NOF Corporation's "MAGNESIUM STEARATE S," magnesium stearate (saturated fatty acid metallic salt), the number of carbon atoms=18

ST-10: Nitto Chemical Industry Co., Ltd.'s "CS-7," calcium behenate (saturated fatty acid metallic salt), the number of carbon atoms=22

ST-11: NOF Corporation's "NONSOUL PK-1," potassium palmitate (saturated fatty acid metallic salt), the number of carbon atoms=16

ST-12: NOF Corporation's "POWDER BASE M," zinc myristate (saturated fatty acid metallic salt), the number of carbon atoms=14

ST-13: Tokyo Chemical Industry Co., Ltd.'s "Calcium Lignocerate," calcium lignocerate (saturated fatty acid metallic salt), the number of carbon atoms=24

ST-14: NOF Corporation's "NONSOUL ON-1N," sodium oleate (unsaturated fatty acid metallic salt with a degree of unsaturation of 1), the number of carbon atoms=18

ST-15: Nitto Chemical Industry Co., Ltd.'s "BS-5," barium linoleate (unsaturated fatty acid metallic salt with a degree of unsaturation of 2), the number of carbon atoms=18

Amino Acid Compounds

ST-16: Ajinomoto Co., Inc.'s "AMIHOPE LL," lauroyl lysine

ST-17: Yoneyama Yakuhin Kogyo Co., Ltd.'s "Glycylglycine," glycylglycine

ST-18: New Japan Chemical Co., Ltd.'s "DL-ALA-NINE," alanine
Silane Compound
  ST-19: Shin-Etsu Chemical Co., Ltd.'s "KBE-3083," octyltriethoxysilane
Intermediate Layer Formation Materials
Polyamine Compounds
  AA-1: Nippon Shokubai Co., Ltd.'s "PEI-1500," polyethyleneimine
  AA-2: BASF Japan Ltd.'s "Dehyquart H81," PEG-15 cocopolyamine
  AA-3: Ichimaru Pharcos Co., Ltd.'s "Polylysine 10," poly-ε-lysine
Polyquaterniums
  AA-4: Nouryon Japan K.K.'s "CELQUAT SC230M," polyquaternium 10
  AA-5: BASF Japan Ltd.'s "Luviquat PQ11AT1," polyquaternium 11
Polysaccharide Compounds
  AA-6: Sumitomo Pharma Food & Chemical Co., Ltd.'s "GLYLOID 6C," *Tamarindus indica* Seed Gum
  AA-7: Sumitomo Pharma Food & Chemical Co., Ltd.'s "RHABALL GUM CG-M," cationized guar gum
Arginine
  AA-8: Ajinomoto Co., Inc.'s "L-Arginine, C grade," arginine
Polysaccharide Compound
  AA-9: Koyo Chemical Co., Ltd.'s "KOYO Chitosan FLA-40," chitosan
Dextrin
  AA-10: San-ei Sucrochemical Co., Ltd.'s "NSD300A," dextrin
Polysaccharide Compound
  AA-11: Hayashibara Co., Ltd.'s "PULLULAN (cosmetic grade)," pullulan
Polyacrylic Acids
  AA-12: Toagosei Co., Ltd.'s "JURYMER AC-10H," a polyacrylic acid, weight-average molecular weight=150,000
  AA-13: Toagosei Co., Ltd.'s "JURYMER AC-10SH," a polyacrylic acid, weight-average molecular weight=1,000,000
External Additives
  EA-1: Wacker Asahikasei Silicone Co., Ltd.'s "HDK N20," silica particles, volume-average particle diameter=200 nm
  EA-2: Wacker Asahikasei Silicone Co., Ltd.'s "HDK T30," silica particles, volume-average particle diameter=300 nm The volume-average particle diameters of the external additives are measured through the same procedure as the volume-average particle diameters of the cellulosic particles.

Examples 1 to 84 and Comparative Examples 1 to 4

Cellulose Acylate Formation

The cellulose acylate of the species and amount (parts) indicated in Table 1 is dissolved in 1000 parts by mass of ethyl acetate. The resulting solution, solution A, is added to a dispersion in which calcium carbonate in the amount (parts) indicated in Table 1 has been dispersed in 500 parts by mass of purified water, and the resulting mixture is stirred for 5 hours.

Then the resulting solution, solution B, is added to a dispersion in which carboxymethylcellulose in the amount (parts) indicated in Table 1 and 300 parts by mass of methyl ethyl ketone have been dispersed in 800 parts by mass of purified water, and the resulting mixture is stirred for 10 minutes using a high-speed emulsifier.

Then sodium hydroxide in the amount (parts) indicated in Table 1 is added to the resulting solution, solution C, the resulting mixture is stirred for the time indicated in Table 1 at 80° ° C. to remove the ethyl acetate and methyl ethyl ketone, and subsequently diluted hydrochloric acid in the amount (parts) indicated in Table 1 is added to dissolve the calcium carbonate and form cellulose acylate particles. Then the particles are isolated by filtration, and the isolated particles are dispersed again in purified water to give a slurry of cellulose acylate particles.

Saponification of Cellulose Acylate Particles

A 20% aqueous solution of sodium hydroxide in the amount (parts) indicated in Table 1 is added to 500 parts by mass of the slurry of cellulose acylate particles (solids content, 50 parts by mass), and saponification is performed by stirring the resulting mixture at the reaction temperature and for the time indicated in Table 1 to form cellulosic particles.

Then hydrochloric acid is added dropwise to the resulting slurry of cellulosic particles until the pH of the slurry reaches the pH in Table 1. Subsequently, the slurry is filtered, the residue is washed with an excess of purified water, and the filtration and washing are repeated until the electrical conductivity of the filtrate reaches 10 μs/cm or less. The final cake of residue is filtered, and the resulting residue is lyophilized to give cellulosic particles (core particles).

Surface Treatment

In certain Examples and Comparative Examples, the cellulosic particles obtained through the saponification of cellulose acylate particles are used as core particles, and the core particles are subjected to the surface treatment described below.

The cake of residue after the repeated filtration and washing until the electrical conductivity of the filtrate reaches 10 μs/cm or less is reslurried with purified water to give a slurry of the core particles.

Then the intermediate layer formation material of the type and amount indicated in Table 1 is added to 500 parts by mass of the slurry of the core particles (solids content, 50 parts by mass), and the resulting mixture is stirred for 3 hours at 30° C. Through that, an intermediate layer is formed on the surface of the core particles.

Then an emulsified form of the coating layer formation material of the type and amount indicated in Table 1 is added to the slurry of core particles having an intermediate layer, and the resulting mixture is stirred for 24 hours. Through that, a coating layer is formed on the surface of the core particles having an intermediate layer.

Then the slurry of core particles having intermediate and coating layers is filtered, the residue is washed with purified water, and the resulting slurry is filtered again. This operation is repeated, and when the electrical conductivity of the filtrate reaches 10 μs/cm or less, the residue is lyophilized to give cellulosic particles having intermediate and coating layers. In addition, the treated surface of the cellulosic particles having intermediate and coating layers is smoothened by stirring the particles using FM Mixer (FM40, Nippon Coke & Engineering) for 3 hours at a frequency of 2000 $min^{-1}$ while the mixer temperature is maintained at 25° C.

Then the external additive of the type and amount (parts) indicated in Table 1 is added to 100 parts of the cellulosic particles having intermediate and coating layers, and the materials are mixed together using a mixing mill (WONDER CRUSHER, Osaka Chemical) to give cellulosic particles having an external additive.

In certain Examples, cellulosic particles composed of a core particle and a coating layer formed thereon without an intermediate layer or cellulosic particles composed of a core particle, a coating layer formed thereon without an intermediate layer, and a subsequently added external additive are produced.

TABLE 1-1

| | | Cellulosic core particles | | | | | | | | | |
|---|---|---|---|---|---|---|---|---|---|---|---|
| | | Cellulose acylate particles | | | | | | Saponification | | | |
| | | Cellulose acylate | | Calcium carbonate | Carboxymeth-ylcellulose | Sodium hydroxide | Stirring | Diluted hydrochloric acid | 20% aqueous solution of sodium hydroxide | Reaction | Stirring | |
| | Particle number | Com-pound | Parts by mass | Parts by mass | Parts by mass | Parts by mass | time hr | Parts by mass | Parts by mass | temperature ° C. | time hours | pH |
| Example 1 | PTC-1 | CA1 | 200 | 60 | 5 | 10 | 18 | 20 | 20 | 40 | 18 | 7 |
| Example 2 | PTC-2 | CA2 | 200 | 60 | 5 | 10 | 18 | 20 | 20 | 40 | 18 | 7 |
| Example 3 | PTC-3 | CA3 | 200 | 60 | 5 | 10 | 18 | 20 | 20 | 40 | 18 | 7 |
| Example 4 | PCT-4 | CA4 | 200 | 60 | 5 | 10 | 18 | 20 | 20 | 40 | 18 | 7 |
| Example 5 | PTC-5 | CA5 | 200 | 60 | 5 | 10 | 18 | 20 | 20 | 40 | 18 | 7 |
| Example 6 | PTC-6 | CA1 | 200 | 60 | 5 | 10 | 18 | 20 | 30 | 40 | 18 | 7 |
| Example 7 | PTC-7 | CA1 | 200 | 60 | 5 | 10 | 18 | 20 | 10 | 40 | 18 | 7 |
| Example 8 | PTC-8 | CA1 | 200 | 60 | 5 | 10 | 18 | 30 | 20 | 40 | 18 | 7 |
| Example 9 | PTC-9 | CA1 | 200 | 60 | 5 | 10 | 18 | 10 | 20 | 40 | 18 | 7 |
| Example 10 | PTC-10 | CA1 | 200 | 80 | 5 | 10 | 18 | 20 | 20 | 40 | 18 | 7 |
| Example 11 | PTC-11 | CA1 | 200 | 30 | 5 | 10 | 18 | 20 | 20 | 40 | 18 | 7 |
| Example 12 | PCT-12 | CA1 | 200 | 70 | 5 | 10 | 18 | 20 | 20 | 40 | 18 | 7 |
| Example 13 | PCT-13 | CA1 | 200 | 40 | 5 | 10 | 18 | 20 | 20 | 40 | 18 | 7 |
| Example 14 | PCT-14 | CA1 | 200 | 60 | 7 | 10 | 18 | 20 | 20 | 40 | 18 | 7 |
| Example 15 | PCT-15 | CA1 | 200 | 60 | 9 | 10 | 18 | 20 | 20 | 40 | 18 | 7 |
| Example 16 | PCT-16 | CA1 | 200 | 60 | 4 | 10 | 18 | 20 | 20 | 40 | 18 | 7 |
| Example 17 | PCT-17 | CA1 | 200 | 60 | 2 | 10 | 18 | 20 | 20 | 40 | 18 | 7 |
| Example 18 | PCT-18 | CA1 | 200 | 60 | 5 | 10 | 12 | 20 | 20 | 40 | 18 | 7 |
| Example 19 | PCT-19 | CA1 | 200 | 60 | 5 | 10 | 10 | 20 | 20 | 40 | 18 | 7 |
| Example 20 | PCT-20 | CA1 | 200 | 60 | 5 | 10 | 18 | 20 | 25 | 40 | 18 | 7 |
| Example 21 | PCT-21 | CA1 | 200 | 60 | 5 | 10 | 18 | 20 | 15 | 40 | 18 | 7 |
| Example 22 | PCT-22 | CA1 | 200 | 60 | 5 | 10 | 18 | 20 | 15 | 40 | 18 | 7 |
| Example 23 | PCT-23 | CA1 | 200 | 60 | 5 | 7 | 18 | 20 | 20 | 40 | 18 | 7 |
| Example 24 | PCT-24 | CA1 | 200 | 60 | 5 | 4 | 18 | 20 | 20 | 40 | 18 | 7 |
| Example 25 | PCT-25 | CA1 | 200 | 60 | 5 | 10 | 18 | 20 | 20 | 40 | 18 | 7 |
| Example 26 | PCT-26 | CA1 | 200 | 60 | 5 | 10 | 18 | 20 | 20 | 40 | 18 | 7 |
| Example 27 | PCT-27 | CA1 | 200 | 60 | 5 | 10 | 18 | 20 | 20 | 40 | 18 | 7 |
| Example 28 | PCT-28 | CA1 | 200 | 60 | 5 | 10 | 18 | 20 | 20 | 40 | 18 | 7 |
| Example 29 | PCT-29 | CA1 | 200 | 60 | 5 | 10 | 18 | 20 | 20 | 40 | 18 | 7 |
| Example 30 | PCT-30 | CA1 | 200 | 60 | 5 | 10 | 18 | 20 | 20 | 40 | 18 | 7 |
| Example 31 | PCT-31 | CA1 | 200 | 60 | 5 | 10 | 18 | 20 | 20 | 40 | 18 | 7 |
| Example 32 | PCT-32 | CA1 | 200 | 60 | 5 | 10 | 18 | 20 | 20 | 40 | 18 | 7 |
| Example 33 | PCT-33 | CA1 | 200 | 60 | 5 | 10 | 18 | 20 | 20 | 40 | 18 | 7 |
| Example 34 | PCT-34 | CA1 | 200 | 60 | 5 | 10 | 18 | 20 | 20 | 40 | 18 | 7 |
| Example 35 | PCT-35 | CA1 | 200 | 60 | 5 | 10 | 18 | 20 | 20 | 40 | 18 | 7 |
| Example 36 | PCT-36 | CA1 | 200 | 60 | 5 | 10 | 18 | 20 | 20 | 40 | 18 | 7 |
| Example 37 | PCT-37 | CA1 | 200 | 60 | 5 | 10 | 18 | 20 | 20 | 40 | 18 | 7 |
| Example 38 | PCT-38 | CA1 | 200 | 60 | 5 | 10 | 18 | 20 | 20 | 40 | 18 | 7 |
| Example 39 | PCT-39 | CA1 | 200 | 60 | 5 | 10 | 18 | 20 | 20 | 40 | 18 | 7 |
| Example 40 | PCT-40 | CA1 | 200 | 60 | 5 | 10 | 18 | 20 | 20 | 40 | 18 | 7 |
| Example 41 | PCT-41 | CA1 | 200 | 60 | 5 | 10 | 18 | 20 | 20 | 40 | 18 | 7 |
| Example 42 | PCT-42 | CA1 | 200 | 60 | 5 | 10 | 18 | 20 | 20 | 40 | 18 | 7 |
| Example 43 | PCT-43 | CA1 | 200 | 60 | 5 | 10 | 18 | 20 | 20 | 40 | 18 | 7 |
| Example 44 | PCT-44 | CA1 | 200 | 60 | 5 | 10 | 18 | 20 | 20 | 40 | 18 | 7 |
| Example 45 | PCT-45 | CA1 | 200 | 60 | 5 | 10 | 18 | 20 | 20 | 40 | 18 | 7 |

TABLE 1-2

| | Surface treatment | | | | | | | Particle characteristics | | | | | Intensity of fluorescent x-rays | | | |
|---|---|---|---|---|---|---|---|---|---|---|---|---|---|---|---|---|
| | Cellulosic core particles | Intermediate layer formation material | | Coating layer formation material | | External additive | | Particle diameter µm | GSDv | Sphericity | Surface smoothness % | Mn | Sodium kcps | Chlorine kcps | Sulfur kcps | Calcium kcps |
| | Parts by mass | Compound | Parts by mass | Compound | Parts by mass | Compound | Parts by mass | | | | | | | | | |
| Example 1 | | | | | | | | 7.1 | 1.29 | 0.9 | 90 | 56000 | 0.065 | 0.055 | 0.03 | 7.5 |
| Example 2 | | | | | | | | 7.2 | 1.22 | 0.9 | 91 | 46000 | 0.045 | 0.033 | 0.025 | 6.8 |
| Example 3 | | | | | | | | 6.9 | 1.23 | 0.91 | 90 | 70000 | 0.054 | 0.034 | 0.015 | 6.5 |
| Example 4 | | | | | | | | 6.8 | 1.25 | 0.9 | 91 | 55000 | 0.067 | 0.032 | 0.048 | 7.2 |
| Example 5 | | | | | | | | 6.5 | 1.34 | 0.88 | 88 | 31000 | 0.056 | 0.018 | 0.025 | 6.9 |
| Example 6 | | | | | | | | 6.7 | 1.25 | 0.9 | 91 | 57000 | 0.095 | 0.011 | 0.023 | 7.8 |
| Example 7 | | | | | | | | 6.5 | 1.28 | 0.89 | 90 | 56000 | 0.018 | 0.017 | 0.026 | 10.3 |
| Example 8 | | | | | | | | 7.1 | 1.27 | 0.9 | 91 | 55000 | 0.043 | 0.078 | 0.028 | 7.8 |
| Example 9 | | | | | | | | 7.1 | 1.22 | 0.88 | 89 | 56000 | 0.047 | 0.004 | 0.027 | 10.5 |
| Example 10 | | | | | | | | 6.9 | 1.23 | 0.9 | 90 | 57000 | 0.055 | 0.022 | 0.028 | 32 |
| Example 11 | | | | | | | | 7.2 | 1.28 | 0.9 | 90 | 56000 | 0.042 | 0.028 | 0.034 | 1.5 |
| Example 12 | | | | | | | | 7.1 | 1.28 | 0.9 | 91 | 56000 | 0.048 | 0.016 | 0.029 | 28 |
| Example 13 | | | | | | | | 6.9 | 1.29 | 0.89 | 89 | 55000 | 0.045 | 0.017 | 0.031 | 3 |
| Example 14 | | | | | | | | 3.3 | 1.55 | 0.88 | 85 | 55000 | 0.048 | 0.028 | 0.034 | 8.9 |
| Example 15 | | | | | | | | 2.8 | 1.61 | 0.89 | 81 | 56000 | 0.038 | 0.027 | 0.031 | 8.8 |
| Example 16 | | | | | | | | 9.5 | 1.21 | 0.93 | 92 | 57000 | 0.067 | 0.017 | 0.028 | 9.5 |
| Example 17 | | | | | | | | 10.2 | 1.22 | 0.92 | 88 | 55000 | 0.055 | 0.018 | 0.028 | 10.1 |
| Example 18 | | | | | | | | 7.2 | 1.68 | 0.96 | 90 | 54000 | 0.054 | 0.022 | 0.025 | 11.9 |
| Example 19 | | | | | | | | 7.8 | 1.73 | 0.87 | 87 | 55000 | 0.056 | 0.023 | 0.021 | 7 |
| Example 20 | | | | | | | | 7.3 | 1.31 | 0.99 | 93 | 57000 | 0.054 | 0.018 | 0.023 | 6.9 |
| Example 21 | | | | | | | | 7.2 | 1.29 | 0.75 | 92 | 54000 | 0.056 | 0.018 | 0.022 | 5.6 |
| Example 22 | | | | | | | | 7.3 | 1.35 | 0.68 | 88 | 55000 | 0.055 | 0.022 | 0.021 | 5.8 |
| Example 23 | | | | | | | | 7.2 | 1.56 | 0.81 | 54 | 57000 | 0.054 | 0.023 | 0.028 | 7.1 |
| Example 24 | | | | | | | | 7 | 1.66 | 0.8 | 48 | 55000 | 0.049 | 0.023 | 0.023 | 5.2 |
| Example 25 | 50 | | | ST-1 | 5 | | | 7.1 | 1.34 | 0.88 | 85 | 57000 | 0.068 | 0.061 | 0.041 | 10.1 |
| Example 26 | 50 | | | ST-2 | 5 | | | 7.7 | 1.42 | 0.87 | 82 | 56000 | 0.075 | 0.06 | 0.042 | 8.5 |
| Example 27 | 50 | | | ST-3 | 5 | | | 7.4 | 1.39 | 0.86 | 82 | 55000 | 0.045 | 0.059 | 0.043 | 7.9 |
| Example 28 | 50 | | | ST-4 | 5 | | | 7.8 | 1.35 | 0.86 | 80 | 56000 | 0.075 | 0.058 | 0.041 | 8.2 |
| Example 29 | 50 | | | ST-5 | 5 | | | 8.1 | 1.36 | 0.85 | 80 | 57000 | 0.032 | 0.059 | 0.039 | 7.1 |
| Example 30 | 50 | | | ST-6 | 5 | | | 7.8 | 1.35 | 0.82 | 79 | 56000 | 0.038 | 0.06 | 0.037 | 6.5 |
| Example 31 | 50 | | | ST-7 | 5 | | | 7.8 | 1.38 | 0.85 | 78 | 55000 | 0.048 | 0.057 | 0.042 | 7.1 |
| Example 32 | 50 | | | ST-8 | 5 | | | 7.7 | 1.39 | 0.82 | 85 | 57000 | 0.048 | 0.054 | 0.041 | 24.5 |
| Example 33 | 50 | | | ST-9 | 5 | | | 7.6 | 1.36 | 0.88 | 83 | 56000 | 0.048 | 0.055 | 0.038 | 10.1 |

TABLE 1-2-continued

| | Surface treatment | | | | | | Particle characteristics | | | | | Intensity of fluorescent x-rays | | | |
|---|---|---|---|---|---|---|---|---|---|---|---|---|---|---|---|
| | Cellulosic core particles Parts by mass | Intermediate layer formation material | | Coating layer formation material | | External additive | | Particle diameter μm | GSDv | Sphericity | Surface smoothness % | Mn | Sodium kcps | Chlorine kcps | Sulfur kcps | Calcium kcps |
| | | Compound | Parts by mass | Compound | Parts by mass | Compound | Parts by mass | | | | | | | | | |
| Example 34 | 50 | | | ST-10 | 5 | | | 7.8 | 1.33 | 0.86 | 85 | 55000 | 0.038 | 0.052 | 0.042 | 7.2 |
| Example 35 | 50 | | | ST-11 | 5 | | | 7.9 | 1.32 | 0.84 | 84 | 56000 | 0.045 | 0.055 | 0.044 | 8.7 |
| Example 36 | 50 | | | ST-12 | 5 | | | 7.5 | 1.33 | 0.88 | 79 | 55000 | 0.056 | 0.059 | 0.042 | 7.2 |
| Example 37 | 50 | | | ST-13 | 5 | | | 7.8 | 1.32 | 0.85 | 78 | 56000 | 0.058 | 0.061 | 0.028 | 22.3 |
| Example 38 | 50 | | | ST-14 | 5 | | | 7.9 | 1.37 | 0.82 | 78 | 57000 | 0.043 | 0.062 | 0.03 | 10.5 |
| Example 39 | 50 | | | ST-15 | 5 | | | 7.9 | 1.33 | 0.82 | 79 | 56000 | 0.043 | 0.067 | 0.027 | 7.8 |
| Example 40 | 50 | | | ST-16 | 5 | | | 8 | 1.36 | 0.84 | 88 | 55000 | 0.042 | 0.065 | 0.028 | 8.9 |
| Example 41 | 50 | | | ST-17 | 5 | | | 8.2 | 1.32 | 0.85 | 85 | 57000 | 0.048 | 0.062 | 0.028 | 10.5 |
| Example 42 | 50 | | | ST-18 | 5 | | | 8.1 | 1.32 | 0.86 | 86 | 56000 | 0.038 | 0.061 | 0.027 | 11.5 |
| Example 43 | 50 | | | ST-19 | 5 | | | 7.9 | 1.33 | 0.87 | 79 | 55000 | 0.048 | 0.065 | 0.026 | 10.8 |
| Example 44 | 50 | | | ST-8 | 3 | | | 8.1 | 1.35 | 0.88 | 82 | 54000 | 0.046 | 0.061 | 0.026 | 22.5 |
| Example 45 | 50 | | | ST-8 | 7 | | | 8.2 | 1.32 | 0.87 | 85 | 55000 | 0.044 | 0.062 | 0.022 | 31.9 |

TABLE 1-3

| | Cellulosic core particles | | | | | | | | | | | |
|---|---|---|---|---|---|---|---|---|---|---|---|---|
| | Cellulose acylate particles | | | | | | | Saponification | | | | |
| | | Cellulose acylate | | Calcium carbonate | Carboxymeth-ylcellulose | Sodium hydroxide | Stirring | Diluted hydro-chloric acid | 20% aqueous solution of sodium hydroxide | Reaction temper-ature | Stirring | |
| | Particle number | Com-pound | Parts by mass | Parts by mass | Parts by mass | Parts by mass | time hr | Parts by mass | Parts by mass | ° C. | time hours | pH |
| Example 46 | PCT-46 | CA1 | 200 | 60 | 5 | 10 | 18 | 20 | 20 | 40 | 18 | 7 |
| Example 47 | PCT-47 | CA1 | 200 | 60 | 5 | 10 | 18 | 20 | 20 | 40 | 18 | 7 |
| Example 48 | PCT-48 | CA1 | 200 | 60 | 5 | 10 | 18 | 20 | 20 | 40 | 18 | 7 |
| Example 49 | PCT-49 | CA1 | 200 | 60 | 5 | 10 | 18 | 20 | 20 | 40 | 18 | 7 |
| Example 50 | PCT-50 | CA1 | 200 | 60 | 5 | 10 | 18 | 20 | 20 | 40 | 18 | 7 |
| Example 51 | PCT-51 | CA1 | 200 | 60 | 5 | 10 | 18 | 20 | 20 | 40 | 18 | 7 |
| Example 52 | PCT-52 | CA1 | 200 | 60 | 5 | 10 | 18 | 20 | 20 | 40 | 18 | 7 |
| Example 53 | PCT-53 | CA1 | 200 | 60 | 5 | 10 | 18 | 20 | 20 | 40 | 18 | 7 |
| Example 54 | PCT-54 | CA1 | 200 | 60 | 5 | 10 | 18 | 20 | 20 | 40 | 18 | 7 |
| Example 55 | PCT-55 | CA1 | 200 | 60 | 5 | 10 | 18 | 20 | 20 | 40 | 18 | 7 |
| Example 56 | PCT-56 | CA1 | 200 | 60 | 5 | 10 | 18 | 20 | 20 | 40 | 18 | 7 |
| Example 57 | PCT-57 | CA1 | 200 | 60 | 5 | 10 | 18 | 20 | 20 | 40 | 18 | 7 |
| Example 58 | PCT-58 | CA1 | 200 | 60 | 5 | 10 | 18 | 20 | 20 | 40 | 18 | 7 |
| Example 59 | PCT-59 | CA1 | 200 | 60 | 5 | 10 | 18 | 20 | 20 | 40 | 18 | 7 |
| Example 60 | PCT-60 | CA1 | 200 | 60 | 5 | 10 | 18 | 20 | 20 | 40 | 18 | 7 |
| Example 61 | PCT-61 | CA1 | 200 | 60 | 5 | 10 | 18 | 20 | 20 | 40 | 18 | 7 |
| Example 62 | PCT-62 | CA1 | 200 | 60 | 5 | 10 | 18 | 20 | 20 | 40 | 18 | 7 |
| Example 63 | PCT-63 | CA3 | 200 | 60 | 5 | 10 | 18 | 20 | 20 | 40 | 18 | 7 |
| Example 64 | PCT-64 | CA4 | 200 | 60 | 5 | 10 | 18 | 20 | 20 | 40 | 18 | 7 |
| Example 65 | PCT-65 | CA1 | 200 | 60 | 5 | 10 | 18 | 20 | 30 | 40 | 18 | 7 |
| Example 66 | PCT-66 | CA1 | 200 | 60 | 5 | 10 | 18 | 20 | 10 | 40 | 18 | 7 |
| Example 67 | PCT-67 | CA1 | 200 | 60 | 5 | 10 | 18 | 30 | 20 | 40 | 18 | 7 |
| Example 68 | PCT-68 | CA1 | 200 | 60 | 5 | 10 | 18 | 10 | 20 | 40 | 18 | 7 |
| Example 69 | PCT-69 | CA1 | 200 | 80 | 5 | 10 | 18 | 20 | 20 | 40 | 18 | 7 |
| Example 70 | PCT-70 | CA1 | 200 | 30 | 5 | 10 | 18 | 20 | 20 | 40 | 18 | 7 |
| Example 71 | PCT-71 | CA1 | 200 | 70 | 5 | 10 | 18 | 20 | 20 | 40 | 18 | 7 |
| Example 72 | PCT-72 | CA1 | 200 | 40 | 5 | 10 | 18 | 20 | 20 | 40 | 18 | 7 |
| Example 73 | PCT-73 | CA1 | 200 | 60 | 5 | 10 | 18 | 20 | 20 | 40 | 18 | 7 |
| Example 74 | PCT-74 | CA1 | 200 | 60 | 5 | 10 | 18 | 20 | 20 | 40 | 18 | 7 |
| Example 75 | PCT-75 | CA1 | 200 | 60 | 5 | 10 | 18 | 20 | 20 | 40 | 18 | 7 |
| Example 76 | PCT-76 | CA1 | 200 | 60 | 5 | 10 | 18 | 20 | 20 | 40 | 18 | 7 |
| Example 77 | PCT-79 | CA6 | 200 | 60 | 5 | 10 | 18 | 20 | 20 | 40 | 18 | 7 |
| Example 78 | PCT-80 | CA7 | 200 | 60 | 5 | 10 | 18 | 20 | 20 | 40 | 18 | 7 |
| Example 79 | PCT-81 | CA1 | 200 | 60 | 5 | 10 | 18 | 40 | 20 | 40 | 18 | 7 |
| Example 80 | PCT-82 | CA1 | 200 | 60 | 5 | 10 | 18 | 5 | 20 | 40 | 18 | 7 |
| Example 81 | PCT-85 | CA6 | 200 | 60 | 5 | 10 | 18 | 20 | 20 | 40 | 18 | 7 |
| Example 82 | PCT-86 | CA7 | 200 | 60 | 5 | 10 | 18 | 20 | 20 | 40 | 18 | 7 |
| Example 83 | PCT-87 | CA1 | 200 | 60 | 5 | 10 | 18 | 40 | 20 | 40 | 18 | 7 |
| Example 84 | PCT-88 | CA1 | 200 | 60 | 5 | 10 | 18 | 5 | 20 | 40 | 18 | 7 |
| Comparative Example 1 | PCT-77 | CA1 | 200 | 60 | 5 | 10 | 18 | 20 | 40 | 40 | 18 | 7 |
| Comparative Example 2 | PCT-78 | CA1 | 200 | 60 | 5 | 10 | 18 | 20 | 5 | 40 | 18 | 7 |
| Comparative Example 3 | PCT-83 | CA1 | 200 | 60 | 5 | 10 | 18 | 20 | 40 | 40 | 18 | 7 |
| Comparative Example 4 | PCT-84 | CA1 | 200 | 60 | 5 | 10 | 18 | 20 | 5 | 40 | 18 | 7 |

TABLE 1-4

| | Surface treatment | | | | | | Particle characteristics | | | | | Intensity of fluorescent x-rays | | | |
|---|---|---|---|---|---|---|---|---|---|---|---|---|---|---|---|
| | Cellulosic core particles | Intermediate layer formation material | | Coating layer formation material | | External additive | | Particle diameter μm | GSDv — | Sphericity — | Surface smoothness % | Mn — | Sodium kcps | Chlorine kcps | Sulfur kcps | Calcium kcps |
| | Parts by mass | Compound | Parts by mass | Compound | Parts by mass | Compound | Parts by mass | | | | | | | | | |
| Example 46 | 50 | AA-1 | 0.5 | ST-8 | 5 | | | 7.4 | 1.29 | 0.9 | 90 | 56000 | 0.038 | 0.05 | 0.028 | 21.5 |
| Example 47 | 50 | AA-2 | 0.5 | ST-8 | 5 | | | 7.3 | 1.31 | 0.91 | 89 | 55000 | 0.039 | 0.048 | 0.03 | 20.9 |
| Example 48 | 50 | AA-3 | 0.5 | ST-8 | 5 | | | 7.2 | 1.33 | 0.89 | 90 | 56000 | 0.036 | 0.047 | 0.032 | 21.3 |
| Example 49 | 50 | AA-4 | 0.5 | ST-8 | 5 | | | 7.2 | 1.34 | 0.88 | 90 | 55000 | 0.036 | 0.048 | 0.032 | 20.8 |
| Example 50 | 50 | AA-5 | 0.5 | ST-8 | 5 | | | 7.1 | 1.32 | 0.89 | 89 | 54000 | 0.037 | 0.045 | 0.033 | 20.5 |
| Example 51 | 50 | AA-6 | 0.5 | ST-8 | 5 | | | 7.1 | 1.31 | 0.89 | 88 | 54000 | 0.037 | 0.047 | 0.031 | 21.3 |
| Example 52 | 50 | AA-7 | 0.5 | ST-8 | 5 | | | 7.8 | 1.29 | 0.9 | 88 | 53000 | 0.039 | 0.045 | 0.031 | 20.8 |
| Example 53 | 50 | AA-8 | 0.5 | ST-8 | 5 | | | 7.2 | 1.28 | 0.84 | 82 | 56000 | 0.038 | 0.046 | 0.031 | 21.3 |
| Example 54 | 50 | AA-9 | 0.5 | ST-8 | 5 | | | 7.2 | 1.28 | 0.9 | 89 | 55000 | 0.037 | 0.047 | 0.029 | 21.9 |
| Example 55 | 50 | AA-10 | 0.5 | ST-8 | 5 | | | 7.3 | 1.29 | 0.85 | 81 | 56000 | 0.039 | 0.047 | 0.028 | 22.3 |
| Example 56 | 50 | AA-11 | 0.5 | ST-8 | 5 | | | 7.2 | 1.33 | 0.9 | 88 | 56000 | 0.029 | 0.044 | 0.031 | 21.2 |
| Example 57 | 50 | AA-12 | 0.5 | ST-8 | 5 | | | 7.3 | 1.21 | 0.89 | 90 | 57000 | 0.037 | 0.042 | 0.031 | 20.9 |
| Example 58 | 50 | AA-13 | 0.5 | ST-8 | 5 | | | 7.2 | 1.29 | 0.89 | 91 | 55000 | 0.033 | 0.041 | 0.028 | 21.3 |
| Example 59 | 50 | AA-1 | 0.25 | ST-8 | 5 | | | 7.2 | 1.28 | 0.9 | 91 | 57000 | 0.028 | 0.043 | 0.028 | 22.2 |
| Example 60 | 50 | AA-1 | 1.5 | ST-8 | 5 | | | 7.1 | 1.27 | 0.89 | 91 | 59000 | 0.031 | 0.044 | 0.028 | 21.5 |
| Example 61 | 50 | AA-1 | 0.5 | ST-8 | 3 | | | 7.1 | 1.32 | 0.89 | 90 | 58000 | 0.033 | 0.042 | 0.029 | 20.3 |
| Example 62 | 50 | AA-1 | 0.5 | ST-8 | 7 | | | 7.1 | 1.33 | 0.9 | 89 | 57000 | 0.036 | 0.041 | 0.028 | 32 |
| Example 63 | 50 | AA-1 | 0.5 | ST-8 | 5 | | | 7 | 1.35 | 0.92 | 90 | 57000 | 0.032 | 0.039 | 0.028 | 22.2 |
| Example 64 | 50 | AA-1 | 0.5 | ST-8 | 5 | | | 7.2 | 1.32 | 0.91 | 91 | 56000 | 0.033 | 0.047 | 0.015 | 21.3 |
| Example 65 | 50 | AA-1 | 0.5 | ST-8 | 5 | | | 7.1 | 1.38 | 0.91 | 89 | 56000 | 0.032 | 0.043 | 0.048 | 20.2 |
| Example 66 | 50 | AA-1 | 0.5 | ST-8 | 5 | | | 7.3 | 1.42 | 0.89 | 90 | 55000 | 0.095 | 0.044 | 0.029 | 20.1 |
| Example 67 | 50 | AA-1 | 0.5 | ST-8 | 5 | | | 7.2 | 1.41 | 0.88 | 91 | 56000 | 0.018 | 0.078 | 0.027 | 7.8 |
| Example 68 | 50 | AA-1 | 0.5 | ST-8 | 5 | | | 7.1 | 1.45 | 0.89 | 91 | 57000 | 0.043 | 0.004 | 0.028 | 10.5 |
| Example 69 | 50 | AA-1 | 0.5 | ST-1 | 5 | | | 7.2 | 1.39 | 0.88 | 92 | 56000 | 0.047 | 0.042 | 0.027 | 32 |
| Example 70 | 50 | AA-1 | 0.5 | ST-1 | 5 | | | 7.3 | 1.42 | 0.89 | 93 | 56000 | 0.032 | 0.041 | 0.028 | 1.5 |
| Example 71 | 50 | AA-1 | 0.5 | ST-1 | 5 | | | 7.2 | 1.44 | 0.9 | 92 | 56000 | 0.031 | 0.044 | 0.029 | 28 |
| Example 72 | 50 | AA-1 | 0.5 | ST-1 | 5 | | | 7.1 | 1.46 | 0.89 | 91 | 55000 | 0.03 | 0.043 | 0.03 | 3 |
| Example 73 | 50 | AA-1 | 0.5 | ST-8 | 5 | EA-1 | 0.5 | 8.3 | 1.55 | 0.82 | 80 | 55000 | 0.032 | 0.055 | 0.034 | 21.2 |
| Example 74 | 50 | AA-1 | 0.5 | ST-8 | 5 | EA-2 | 0.5 | 8.5 | 1.45 | 0.81 | 82 | 56000 | 0.04 | 0.054 | 0.035 | 20.3 |
| Example 75 | 50 | AA-1 | 0.5 | ST-8 | 5 | EA-1 | 5 | 8.3 | 1.52 | 0.81 | 82 | 57000 | 0.042 | 0.054 | 0.032 | 20.1 |
| Example 76 | 50 | AA-1 | 0.5 | ST-8 | 5 | EA-1 | 0.5 | 8.2 | 1.55 | 0.83 | 80 | 56000 | 0.043 | 0.056 | 0.031 | 22.2 |
| Example 77 | 50 | AA-1 | 0.5 | ST-8 | 5 | | | 6.8 | 1.29 | 0.88 | 85 | 57000 | 0.042 | 0.042 | 0.008 | 8.5 |
| Example 78 | 50 | AA-1 | 0.5 | ST-8 | 5 | | | 6.9 | 1.3 | 0.89 | 87 | 56000 | 0.03 | 0.045 | 0.053 | 8.3 |
| Example 79 | 50 | AA-1 | 0.5 | ST-8 | 5 | | | 6.8 | 1.29 | 0.87 | 88 | 57000 | 0.033 | 0.082 | 0.032 | 9.1 |
| Example 80 | | | | ST-8 | 5 | | | 6.7 | 1.29 | 0.87 | 89 | 55000 | 0.034 | 0.002 | 0.032 | 8.2 |

TABLE 1-4-continued

| | Surface treatment | | | | | | | Particle characteristics | | | | | | | | |
|---|---|---|---|---|---|---|---|---|---|---|---|---|---|---|---|---|
| | Cellulosic core particles | Intermediate layer formation material | | Coating layer formation material | | External additive | | Particle diameter μm | GSDv | Sphericity | Surface smoothness % | Mn | Intensity of fluorescent x-rays | | | |
| | Parts by mass | Compound | Parts by mass | Compound | Parts by mass | Compound | Parts by mass | | | | | | Sodium kcps | Chlorine kcps | Sulfur kcps | Calcium kcps |
| Example 81 | 50 | AA-1 | 0.5 | ST-8 | 5 | | | 7.3 | 1.33 | 0.83 | 86 | 54000 | 0.034 | 0.043 | 0.007 | 22.5 |
| Example 82 | 50 | AA-1 | 0.5 | ST-8 | 5 | | | 7.2 | 1.35 | 0.84 | 85 | 55000 | 0.032 | 0.042 | 0.052 | 22.2 |
| Example 83 | 50 | AA-1 | 0.5 | ST-8 | 5 | | | 7.2 | 1.38 | 0.85 | 86 | 54000 | 0.032 | 0.083 | 0.032 | 22.3 |
| Example 84 | 50 | AA-1 | 0.5 | ST-8 | 5 | | | 7.8 | 1.42 | 0.86 | 87 | 55000 | 0.031 | 0.002 | 0.034 | 21.8 |
| Comparative Example 1 | | | | | | | | 6.9 | 1.29 | 0.9 | 89 | 56000 | 0.105 | 0.043 | 0.033 | 10.3 |
| Comparative Example 2 | 50 | AA-1 | 0.5 | | | | | 6.9 | 1.28 | 0.9 | 88 | 55000 | 0.012 | 0.045 | 0.031 | 9.8 |
| Comparative Example 3 | | | | ST-8 | 5 | | | 6.8 | 1.33 | 0.83 | 88 | 54000 | 0.11 | 0.042 | 0.031 | 21.5 |
| Comparative Example 4 | 50 | AA-1 | 0.5 | ST-8 | 5 | | | 6.9 | 1.38 | 0.82 | 85 | 55000 | 0.013 | 0.045 | 0.031 | 21.3 |

Comparative Examples 5 to 9

The following particles are used as cellulosic particles of these Comparative Examples.

Comparative Example 5: CELLULOBEADS D10 (Daito Kasei, cellulosic particles containing cellulose as their base constituent. No intermediate layer, no coating layer, and no external additive.)

Comparative Example 6: CELLUFLOW C25 (JNC, cellulosic particles containing cellulose as their base constituent. No intermediate layer, no coating layer, and no external additive.)

Comparative Example 7: CELLUFLOW T25 (JNC, cellulosic particles containing cellulose acetate as their base constituent. No intermediate layer, no coating layer, and no external additive.)

Comparative Example 8: OTS-0.5A CELLULOBEADS D10 (Daito Kasei, cellulosic particles having a core particle containing cellulose as its base constituent and a coating layer containing triethoxyoctylsilane. No external additive.)

Comparative Example 9: S-STM CELLULOBEADS D-5 (Daito Kasei, cellulosic particles having a core particle containing cellulose as its base constituent and a coating layer containing magnesium stearate. No external additive.)

Comparative Example 10

Cellulosic particles are obtained according to the procedure described in Example 1 in Japanese Patent No. 6921293. The specific production process is as follows.

An oil phase is prepared by dissolving 150 parts of cellulose acetate (trade name "CA-398-6." Eastman Chemical; the percentage of acetyl groups, 39.8%) in 1,350 parts of ethyl acetate (solubility in water, 8 g/100 g). A water phase is prepared by dissolving 100 parts of polyvinyl alcohol in 1,250 parts of deionized water. The oil phase is added to the prepared water phase, the two phases are mixed together, and the resulting mixture is stirred for 3 minutes at 1,000 rpm using a dissolver. The mixture is further stirred for 10 minutes at 2,000 rpm using a dissolver to give a suspension in which oil droplets are uniformly dispersed. The volume-average particle diameter of the oil droplets measured through observation under an optical microscope and image analysis is 18 μm.

While the resulting suspension is stirred at 500 rpm using a dissolver, 42,000 parts of deionized water is introduced over 90 minutes to give a resin particle dispersion. After filtration and washing, the resin particles are deflocculated in deionized water and stirred. The resin particles are collected by filtration and washed, and the washed resin particles are dispersed in 2,500 parts of deionized water. The pH is adjusted to 13.0 or lower by adding sodium hydroxide, and hydrolysis is performed through heating to 50° C. After the end of the hydrolysis, the dispersion is neutralized with hydrochloric acid. After filtration and washing, the product is deflocculated in deionized water. Then, after filtration and washing, drying and crushing are performed to give core beads having a median diameter (D50) of 9 μm.

Fifty grams of the resulting core beads and 1.5 g of zinc stearate (trade name "SPZ-100F," Sakai Chemical Industry; a powder of sheet-shaped particles; average particle diameter, 0.4 μm; thickness, 0.1 μm; aspect ratio, 3) are put into a small-sized mixer. The surface of the core beads is treated with the zinc stearate through dry mixing for 3 minutes to give resin beads.

The resulting resin beads are used as cellulosic particles of Comparative Example 10.

Comparative Example 11

Cellulosic particles are obtained according to the procedure described in Example 2 in Japanese Patent No. 6921293. The specific production process is as follows.

Resin beads are obtained in the same manner as in Example 1 in Japanese Patent No. 6921293, except that 2.5 g of magnesium stearate (trade name "SPX-100F," Sakai Chemical Industry; a powder of sheet-shaped particles; average particle diameter, 0.7 μm; thickness, 0.1 μm; aspect ratio, 4) is used instead of the zinc stearate.

The resulting resin beads are used as cellulosic particles of Comparative Example 11.

TABLE 2

| | | Product name | Manufacturer | Core particles | Intermediate layer formation material | Coating layer formation material | External additive |
|---|---|---|---|---|---|---|---|
| Comparative Example 5 | PTC-101 | CELLULOBEADS D10 | Daito Kasei | Cellulose | None | None | None |
| Comparative Example 6 | PTC-102 | CELLUFLOW C25 | JNC | Cellulose | None | None | None |
| Comparative Example 7 | PTC-103 | CELLUFLOW T25 | JNC | Cellulose | None | None | None |
| Comparative Example 8 | PTC-104 | OTS-0.5A CELLULOBEADS D-10 (Example 1 in Japanese Unexamined Patent Application Publication No. 2020-132616) | Daito Kasei | Cellulose | None | Triethoxy-octylsilane | None |
| Comparative Example 9 | PTC-105 | S-STM CELLULOBEADS D-5 (Example 2 in Japanese Unexamined Patent Application Publication No. 2020-132616) | Daito Kasei | Cellulose | None | Magnesium stearate | None |

TABLE 2-continued

| | Particle diameter μm | GSDv | Sphericity | Surface smoothness % | Mn | Intensity of fluorescent x-rays in XRF | | | |
|---|---|---|---|---|---|---|---|---|---|
| | | | | | | Sodium kcps | Chlorine kcps | Sulfur kcps | Calcium kcps |
| Comparative Example 5 | 14 | 1.17 | 0.97 | 94 | 110000 | 0.008 | 0.001 | 0.088 | 0.001 |
| Comparative Example 6 | 10 | 1.86 | 0.97 | 88 | 45000 | 0.001 | 0.055 | 0.033 | 11.5 |
| Comparative Example 7 | 12 | 1.94 | 0.98 | 88 | 48000 | 0.001 | 0.001 | 0.023 | 0.001 |
| Comparative Example 8 | 14 | 1.32 | 0.98 | 85 | 110000 | 0.007 | 0.001 | 0.085 | 0.001 |
| Comparative Example 9 | 10 | 1.86 | 0.97 | 56 | 110000 | 0.007 | 0.001 | 0.089 | 0.001 |

| | Related art | Core particles | Intermediate layer formation material | Coating layer formation material | External additive | Average particle diameter μm |
|---|---|---|---|---|---|---|
| Comparative Example 10 | PTC-111 | Example 1 in Japanese Patent No. 6921293 | Cellulose | None | Zinc stearate | None | 9 |
| Comparative Example 11 | PTC-112 | Example 2 in Japanese Patent No. 6921293 | Cellulose | None | Magnesium stearate | None | 9 |

| | GSDv | Sphericity | Surface smoothness % | Mn | Intensity of fluorescent x-rays in XRF | | | |
|---|---|---|---|---|---|---|---|---|
| | | | | | Sodium kcps | Chlorine kcps | Sulfur kcps | Calcium kcps |
| Comparative Example 10 | 1.45 | 0.96 | 92 | 33000 | 0.001 | 0.062 | 0.035 | 12.3 |
| Comparative Example 11 | 1.55 | 0.96 | 92 | 32000 | 0.001 | 0.055 | 0.032 | 11.8 |

Characteristics Evaluation
Particle Characteristics

For the cellulosic particles obtained in the Examples and Comparative Examples, the following particle characteristics are measured according to the methods described above.

Volume-average particle diameter ("Particle diameter" in the tables)
Upper geometric standard deviation by number ("GSDv" in the tables)
Sphericity
Surface smoothness
Number-average molecular weight of cellulose ("Mn" in the tables)
Intensity of sodium fluorescent x-rays
Intensity of chlorine fluorescent x-rays
Intensity of sulfur fluorescent x-rays
Intensity of calcium fluorescent x-rays Percentage Biodegradability The 60-day percentage biodegradability in activated sludge of the cellulosic particles obtained in the Examples and Comparative Examples is measured by a method according to OECD 306F.

Cosmetics Evaluation
Production of Cosmetics

Of the cellulosic particles of the Examples and Comparative Examples, the cellulosic particles indicated in Table 4 are used to produce a variety of cosmetics. Specifically, the following is performed.

Liquid Foundation

According to the formula presented in Table 3-1, liquid foundation is obtained by a known method.

TABLE 3-1

| Liquid Foundation | | | |
|---|---|---|---|
| Formula | Compound | Product name (manufacturer) | Parts by mass |
| Particles | Particles | The cellulosic particles specified in Table 4 | 10 |
| Ingredients other than the particles | Propylene glycol | Propylene Glycol JSQI (Dow Toray) | 5 |
| | Bentonite | OVWIL BR (Mizusawa Industrial Chemicals) | 1 |
| | Triethanolamine | Triethanolamine 99% (Dow Toray) | 1 |
| | Stearic acid | NAA172 (NOF) | 3 |
| | Stearyl alcohol | NAA45 (NOF) | 1 |
| | Liquid paraffin | MORESCO-VIOLESS (MORESCO) | 8 |
| | Isopropyl myristate | IPM-R (NOF) | 5 |
| | Petrolatum | NOMCORT W (Nisshin OilliO) | 2 |
| | Stearic acid monoglyceride | EXCEL 84 (Kao Chemicals) | 2 |
| | POE (20) stearyl ether | EMALEX 602 (Nihon Emulsion) | 1 |

TABLE 3-1-continued

Liquid Foundation

| Formula | Compound | Product name (manufacturer) | Parts by mass |
|---|---|---|---|
| | Titanium oxide | MKR-1 (Sakai Chemical) | 8 |
| | Kaolin | BERACLAY 20061 AMAZONIAN WHITE CLAY (BERECA) | 5 |
| | Iron oxide | C33-128 Sun CROMA RED Iron Oxide (Sun Chemical) | 0.5 |
| | Preservative | OPTIPHEN HD (Ashland Japan) | 0.5 |
| | Fragrance | Bisabolol rac. (BASF Japan) | 0.3 |
| | Purified water | | 46.5 |
| | | Total | 100 |

Milky Lotion

According to the formula presented in Table 3-2, a milky lotion is obtained by a known method.

TABLE 3-2

Milky Lotion

| Formula | Compound | Product name (manufacturer) | Parts by mass |
|---|---|---|---|
| Particles | Particles | As in the Example or Comparative Example | 2 |
| Ingredients other than the particles | Propylene glycol | Propylene Glycol JSQI (Dow Toray) | 5 |
| | Polyethylene glycol 1500 | PEG#1500 (NOF) | 3 |
| | Carboxy vinyl polymer | NTC-CARBOMER 380 (Nikko Chemicals) | 0.1 |
| | Triethanolamine | Triethanolamine 99% (Dow Toray) | 1 |
| | Stearic acid | NAA172 (NOF) | 2 |
| | Cetyl alcohol | NAA44 (NOF) | 1.5 |
| | Liquid paraffin | MORESCO-VIOLESS (MORESCO) | 10 |
| | Petrolatum | NOMCORT W (Nisshin OilliO) | 3 |
| | Glyceryl oleate | NIKKOL MGO (Nikko Chemicals) | 1 |
| | POE (20) sorbitan oleate | NIKKOL TO -OV (Nikko Chemicals) | 1 |
| | Preservative | OPTIPHEN HD (Ashland Japan) | 0.2 |
| | Fragrance | Bisabolol rac. (BASF Japan) | 0.1 |
| | Purified water | | 70.1 |
| | | Total | 100 |

Loose Powder

The ingredients listed in Table 3-3 are mixed together in a blender, the resulting mixture is milled in a mill, and then the resulting particles are sieved through a 250-μm mesh sieve to give a loose powder.

TABLE 3-3

Loose Powder

| Formula | Compound | Product name (manufacturer) | Parts by mass |
|---|---|---|---|
| Particles | Particles | The cellulosic particles specified in Table 4 | 10 |
| Ingredients other than the particles | Talc | Talc CT-25 (Yamaguchi Mica) | 65 |
| | Kaolin | BERACLAY 20061 AMAZONIAN WHITE CLAY (BERECA) | 5 |
| | Titanium oxide | MKR-1 (Sakai Chemical) | 3 |
| | Zinc myristate | POWDER BASE M (NOF) | 5 |
| | Magnesium carbonate | Natrasorb HFB (Nouryon Japan) | 5 |
| | Sericite | Sericite FSE (Sanshin Mining Ind.) | 7 |
| | | Total | 100 |

Powder Foundation

According to the formula presented in Table 3-4, the particles and powders are mixed together, the binders are mixed together separately, the mixture of particles and powders is gradually added into the binders with stirring, and then the mixture is mixed to give powder foundation.

TABLE 3-4

Powder Foundation

| Formula | Compound | Product name (manufacturer) | Parts by mass |
|---|---|---|---|
| Particles | Particles | The cellulosic particles specified in Table 4 | 8 |
| Powders other than the particles | Talc | Talc CT-25 (Yamaguchi Mica) | 52.5 |
| | Mica | Mica FA450 (Yamaguchi Mica) | 16 |
| | Titanium oxide | MKR-1 (Sakai Chemical) | 12 |
| | Black iron oxide | C33-134 Sun CROMA Black Iron Oxide (Sun Chemical) | 0.2 |
| | Red iron oxide | C33-128 Sun CROMA Red Iron Oxide (Sun Chemical) | 0.4 |
| | Yellow iron oxide | C33-210 Sun CROMA Yellow Iron Oxide (Sun Chemical) | 2.4 |
| Binders | Diisostearyl malate | Neosolue-DiSM (Nippon Fine Chemical) | 3 |
| | Caprylic/capric triglyceride | Caprylic/Capric Triglyceride (FUJIFILM Wako Pure Chemical) | 2 |
| | Neopentyl glycol dicaprate | NPDC (Kokyu Alcohol Kogyo) | 2 |
| | Pentylene glycol | DIOL PD (Kokyu Alcohol Kogyo) | 1.5 |
| | | Total | 100 |

Sunscreen Cream

According to the formula presented in Table 3-5, oil phase (1) is warmed to 50° C. until dissolution, then oil phase (2) is added, and the two phases are mixed together. Water phase (2) is brought into dissolution and mixed with water phase (1). After the particles and the powders are added to the mixture of oil phases (1) and (2) and dispersed and mixed, emulsification is performed by gradually adding the mixture of water phases (1) and (2), giving a sunscreen cream.

TABLE 3-5

Sunscreen Cream

| Formula | Compound | Product name (manufacturer) | Parts by mass |
|---|---|---|---|
| Particles | Particles | The cellulosic particles specified in Table 4 | 5 |
| Powders other than the particles | Quaternium-18 hectorite | SUMECTON-SAN (Kunimine Industries) | 1 |
| | Titanium oxide | MKR-1 (Sakai Chemical) | 8 |
| Oil phase (1) | Ethylhexyl methoxycinnamate | Uvinul MC80 (BASF Japan) | 4 |
| | t-Butyl methoxydibenzoylmethane | Eusolex 9030 (Merck KGaA) | 0.5 |
| | Bis-ethylhexyloxyphenol methoxyphenyl triazine | Tinosorb S (BASF Japan) | 2 |
| | Isopropyl sebacate | Isopropyl Sebacate (FUJIFILM Wako Pure Chemical) | 6 |
| | Caprylic/capric triglyceride | Caprylic/Capric Triglyceride (FUJIFILM Wako Pure Chemical) | 2 |
| Oil phase (2) | Cetyl PEG/PPG-10/1 dimethicone | KF-6048 (Shin-Etsu Chemical) | 4 |
| | Sorbitan isostearate | EMALEX SPIS 100 (Nihon Emulsion) | 0.4 |
| | Cyclopentasiloxane | KF-995 (Shin-Etsu Chemical) | 16 |
| | Ethylhexylglycerin, glyceryl caprylate | NIKKOL NIKKOGUARD 88 (Nikko Chemicals) | 0.4 |
| Water phase (1) | PEG-240/HDI copolymer bis-decyltetradeceth-20 ether | ADEKA NOL GT 700 | 1 |
| | Glycerin | RG-CO-P (NOF) | 4 |
| | 1,3-Butylene glycol | HAISUGARCANE BG (Kokyu Alcohol Kogyo) | 4 |
| | Pentylene glycol | DIOL PD (Kokyu Alcohol Kogyo) | 1 |
| | Phenoxyethanol | Phenoxetol (Clariant Japan) | 0.3 |
| Water phase (2) | Magnesium sulfate | Magnesium Sulfate (FUJIFILM Wako Pure Chemical) | 0.3 |
| | Purified water | | 40.1 |
| | | Total | 100 |

All-in-One Gel

According to the formula presented in Table 3-6, water phases (1) and (2) are mixed together. Then oil phase (1) is mixed and added to the mixture of water phases (1) and (2). After oil phase (2) is warmed to 70° C., the particles are added to give a dispersion. The resulting dispersion is added to the mixture of water phases (1) and (2) and oil phase (1), and emulsification is performed by stirring and mixing the resulting mixture. After the neutralizing agent is added, the emulsion is stirred and cooled to give an all-in-one gel.

TABLE 3-6

All-in-One Gel

| Formula | Compound | Product name (manufacturer) | Parts by mass |
|---|---|---|---|
| Particles | Particles | The cellulosic particles specified in Table 4 | 4 |
| Oil phase (1) | Xanthan gum | NOMCORT Z (The Nisshin OilliO Group) | 0.1 |
| | Hydrogenated lecithin | COATSOME NC-21 (NOF) | 0.1 |
| | Glycerin | RG-CO-P (NOF) | 5 |
| | Isopentyldiol | Isoprene Glycol (Kuraray) | 4 |
| Oil phase (2) | Polyglyceryl-10 isostearate | Sunsoft Q-18S-C (Taiyo Kagaku) | 1.2 |
| | Polyglyceryl-4 isostearate | NIKKOL Tetraglyn 1-SV (Nikko Chemicals) | 0.3 |
| | Behenyl alcohol | NAA-422 (NOF) | 1.8 |
| | Octyldodecanol | RISONOL 20SP (Kokyu Alcohol Kogyo) | 0.8 |
| | Cetyl ethylhexanoate | FineNeo-CIO (Nippon Fine Chemical) | 3.2 |
| | Squalane | NIKKOL Olive Squalane (Nikko Chemicals) | 0.6 |
| | Tocopherol | Tocopherol 100 (The Nisshin OilliO Group) | 0.6 |
| | Ethylhexylglycerin, glyceryl caprylate | NIKKOL NIKKOGUARD 88 (Nikko Chemicals) | 0.6 |
| Water phase (1) | Carboxy vinyl polymer | NTC-CARBOMER 380 (Nikko Chemicals) | 0.4 |
| | Pentylene glycol | DIOL PD (Kokyu Alcohol Kogyo) | 1 |
| | Phenoxyethanol | Phenoxetol (Clariant Japan) | 0.3 |
| | Sodium dilauramidoglutamide lysine, water | Pellicer LB100 (Asahi Kasei Finechem) | 0.1 |
| Water phase (2) | Citric acid | Citric Acid (FUJIFILM Wako Pure Chemical) | 0.1 |
| | Purified water | | 1.4 |
| Neutralizing agent A 10% aqueous solution of sodium hydroxide | | | |
| | | Total | 100 |

Foundation Primer

According to the formula presented in Table 3-7, the particles are dispersed in component A, and the resulting mixture is stirred. Component B is added, and the resulting mixture is stirred to give a foundation primer.

TABLE 3-7

Foundation Primer

| Formula | Compound | Product name (manufacturer) | Parts by mass |
|---|---|---|---|
| Particles | Particles | The cellulosic particles specified in Table 4 | 10 |
| Component A | (Dimethicone/PEG-10/15) crosspolymer, dimethicone | KSG-210 (Shin-Etsu Chemical) | 3.5 |
| | PEG-9 polydimethylsiloxyethyl dimethicone | KF-6028 (Shin-Etsu Chemical) | 2 |
| | Dimethicone | KF-7312K (Shin-Etsu Chemical) | 5 |
| | Isononyl isononanoate | KAK99 (Kokyu Alcohol Kogyo) | 4.5 |
| | Ethylhexyl methoxycinnamate | NOMCORT TAB (The Nisshin OilliO Group) | 10 |
| | Quaternium-18 hectorite | SUMECTON-SAN (Kunimine Industries) | 1.2 |
| | (Dimethicone/vinyl dimethicone) crosspolymer, dimethicone | KSG-16 (Shin-Etsu Chemical) | 5 |
| | Cyclomethicone | DOWSIL SH245 Fluid (Dow Toray) | 25 |

TABLE 3-7-continued

Foundation Primer

| Formula | Compound | Product name (manufacturer) | Parts by mass |
| --- | --- | --- | --- |
| Component B | 1,3-Butylene glycol | HAISUGARCANE BG (Kokyu Alcohol Kogyo) | 5 |
| | Sodium citrate | Trisodium Citrate (Jungbunzlauer International AG) | 2 |
| | Preservative | OPTIPHEN HD (Ashland Japan) | 0.3 |
| | Purified water | | 26.5 |
| | Total | | 100 |

Lip Primer

According to the formula presented in Table 3-8, component B is heated to 60° ° C. and mixed. The particles are dispersed in the mixture, component A is added, heating in a microwave is performed until dissolution, the resulting solution is mixed, and then the resulting mixture is poured into a mold and cooled. The resulting solid is set into a lipstick case to give a lip primer.

TABLE 3-8

Lip Primer

| Formula | Compound | Product name (manufacturer) | Parts by mass |
| --- | --- | --- | --- |
| Particles | Particles | The cellulosic particles specified in Table 4 | 10 |
| Component A | Ceresin | CERESIN #810 (Nikko Rika) | 4.27 |
| | Microcrystalline wax | Refined Microcrystalline Wax (Nikko Rika) | 1.55 |
| | Candelilla wax | Refined Candelilla Wax No. 1 (Nippon Wax) | 5.03 |
| | Paraffin | Refined Paraffin Wax (Nikko Rika) | 3.07 |
| Component B | Diisostearyl malate | Neosolue-DiSM (Nippon Fine Chemical) | 17.95 |
| | Dipentaerythrite fatty acid ester | COSMOL 168 EV (The Nisshin OilliO Group) | 6.22 |
| | Adsorption refined lanolin | SUPER STEROL LIQUID (Croda Japan) | 2.52 |
| | Liquid lanolin acetate | ACELAN SP (Croda Japan) | 13.34 |
| | Ethylhexylglyceryl | GLYMOIST (NOF) | 19.02 |
| | Liquid paraffin | HYDROBRITE 380 PO (Sonneborn) | 7.28 |
| | Isotridecyl isononanoate | KAK139 (Kokyu Alcohol Kogyo) | 3.21 |
| | Polyglyceryl-2 triisostearate | EMALEX TISG-2 (Nihon Emulsion) | 4.01 |
| | Methylphenyl polysiloxane | BELSIL PDM 20 (Wacker Asahikasei Silicone) | 2.41 |
| | Methylparaben | Nipagin M (Clariant Japan) | 0.07 |
| | Tocopherol | Tocopherol 100 (The Nisshin OilliO Group) | 0.05 |
| | Total | | 100 |

Body Powder

A body powder is obtained by mixing together the ingredients listed in Table 3-9 using a laboratory mixer.

TABLE 3-9

Body Powder

| Formula | Compound | Product name (manufacturer) | Parts by mass |
| --- | --- | --- | --- |
| Particles | Particles | The cellulosic particles specified in Table 4 | 10 |
| Ingredients other than the particles | Talc | Talc CT-25 (Yamaguchi Mica) | 89.7 |
| | Fragrance | Bisabolol rac. (BASF Japan) | 0.3 |

Solid Powder Eyeshadow

According to the formula presented in Table 3-10, the particles and powders are mixed together, the binder is uniformly dissolved, the resulting solution is added to the powder mixture, the resulting mixture is further mixed, and then the resulting mixture is compression-molded to give a solid powder eyeshadow.

TABLE 3-10

Solid Powder Eyeshadow

| Formula | Compound | Product name (manufacturer) | Parts by mass |
|---|---|---|---|
| Particles | Particles | The cellulosic particles specified in Table 4 | 51 |
| Powders other than the particles | Mica | Talc CT-25 (Yamaguchi Mica) | 15 |
| | Sericite | Sericite FSE (Sanshin Mining Ind.) | 5 |
| | Pigment | Unipure Blue LC 621 (Sensient Technologies Japan) | 15 |
| | Pearl pigment | TWINCLEPEARL (Nihon Koken Kogyo | 10 |
| Binder | Methyl polysiloxane | BELSIL DM 10 (Wacker Asahikasei Silicone) | 2 |
| Others | Sorbitan sesquioleate | EMALEX SPO-150 (Nihon Emulsion) | 2 |
| | | Total | 100 |

Evaluations

The coating unevenness of the resulting cosmetics is evaluated as follows.

For each type of cellulosic particles and cosmetic, ten female testers are asked to put a 5-g sample on the back of their hand, spread the sample, and rate it with the best being 10 and the worst being 0.

The better the evaluation result for coating unevenness, the more the dispersibility of the cellulosic particles in a dispersion containing the cellulosic particles may improve.

TABLE 4-1

| | Particle number | Percentage biodegradability (%) of the particles | Coating unevenness | | | | |
|---|---|---|---|---|---|---|---|
| | | | Particles | Liquid foundation | Milky lotion | Loose powder | Powder foundation |
| Example 1 | PTC-1 | 97 | 8 | 8 | 8 | 8 | 8 |
| Example 2 | PTC-2 | 97 | 8 | 8 | 8 | 8 | 8 |
| Example 3 | PTC-3 | 98 | 8 | 8 | 8 | 8 | 8 |
| Example 4 | PCT-4 | 97 | 8 | 8 | 8 | 8 | 8 |
| Example 5 | PTC-5 | 96 | 7 | 8 | 8 | 7 | 7 |
| Example 6 | PTC-6 | 97 | 8 | 8 | 8 | 8 | 8 |
| Example 7 | PTC-7 | 97 | 8 | 8 | 8 | 8 | 8 |
| Example 8 | PTC-8 | 98 | 8 | 8 | 8 | 8 | 8 |
| Example 9 | PTC-9 | 97 | 8 | 8 | 8 | 8 | 8 |
| Example 10 | PTC-10 | 93 | 7 | 8 | 8 | 7 | 7 |
| Example 11 | PTC-11 | 94 | 7 | 8 | 8 | 7 | 7 |
| Example 12 | PCT-12 | 96 | 8 | 8 | 8 | 8 | 8 |
| Example 13 | PCT-13 | 97 | 8 | 8 | 8 | 8 | 8 |
| Example 14 | PCT-14 | 96 | 8 | 8 | 8 | 8 | 8 |
| Example 15 | PCT-15 | 94 | 7 | 8 | 8 | 7 | 7 |
| Example 16 | PCT-16 | 96 | 8 | 8 | 8 | 8 | 8 |
| Example 17 | PCT-17 | 94 | 7 | 8 | 8 | 7 | 7 |
| Example 18 | PCT-18 | 96 | 8 | 8 | 8 | 8 | 8 |
| Example 19 | PCT-19 | 93 | 7 | 8 | 8 | 7 | 7 |
| Example 20 | PCT-20 | 97 | 8 | 8 | 8 | 8 | 8 |
| Example 21 | PCT-21 | 96 | 8 | 8 | 8 | 8 | 8 |
| Example 22 | PCT-22 | 93 | 7 | 8 | 8 | 7 | 7 |
| Example 23 | PCT-23 | 97 | 8 | 8 | 8 | 8 | 8 |
| Example 24 | PCT-24 | 93 | 7 | 8 | 8 | 7 | 7 |
| Example 25 | PCT-25 | 94 | 9 | 9 | 9 | 9 | 9 |
| Example 26 | PCT-26 | 94 | 9 | 9 | 9 | 9 | 9 |
| Example 27 | PCT-27 | 93 | 9 | 9 | 9 | 9 | 9 |
| Example 28 | PCT-28 | 90 | 8 | 9 | 9 | 8 | 8 |
| Example 29 | PCT-29 | 89 | 8 | 9 | 9 | 8 | 8 |
| Example 30 | PCT-30 | 89 | 8 | 9 | 9 | 8 | 8 |
| Example 31 | PCT-31 | 90 | 8 | 9 | 9 | 8 | 8 |
| Example 32 | PCT-32 | 93 | 9 | 9 | 9 | 9 | 9 |
| Example 33 | PCT-33 | 94 | 9 | 9 | 9 | 9 | 9 |
| Example 34 | PCT-34 | 93 | 9 | 9 | 9 | 9 | 9 |
| Example 35 | PCT-35 | 93 | 9 | 9 | 9 | 9 | 9 |
| Example 36 | PCT-36 | 89 | 8 | 9 | 9 | 8 | 8 |

TABLE 4-1-continued

|  | Particle number | Percentage biodegradability (%) of the particles | Coating unevenness | | | | |
|---|---|---|---|---|---|---|---|
|  |  |  | Particles | Liquid foundation | Milky lotion | Loose powder | Powder foundation |
| Example 37 | PCT-37 | 90 | 8 | 9 | 9 | 8 | 8 |
| Example 38 | PCT-38 | 90 | 8 | 9 | 9 | 8 | 8 |
| Example 39 | PCT-39 | 89 | 8 | 9 | 9 | 8 | 8 |
| Example 40 | PCT-40 | 93 | 9 | 9 | 9 | 9 | 9 |
| Example 41 | PCT-41 | 94 | 9 | 9 | 9 | 9 | 9 |
| Example 42 | PCT-42 | 93 | 9 | 9 | 9 | 9 | 9 |
| Example 43 | PCT-43 | 89 | 8 | 9 | 9 | 8 | 8 |
| Example 44 | PCT-44 | 94 | 9 | 9 | 9 | 9 | 9 |
| Example 45 | PCT-45 | 93 | 9 | 9 | 9 | 9 | 9 |

TABLE 4-2

|  | Coating unevenness | | | | | |
|---|---|---|---|---|---|---|
|  | Sunscreen cream | All-in-one gel | Foundation primer | Lip primer | Body powder | Solid powder eyeshadow |
| Example 1 | 8 | 8 | 8 | 8 | 8 | 8 |
| Example 2 | 8 | 8 | 8 | 8 | 8 | 8 |
| Example 3 | 8 | 8 | 8 | 8 | 8 | 8 |
| Example 4 | 8 | 8 | 8 | 8 | 8 | 8 |
| Example 5 | 8 | 8 | 7 | 7 | 7 | 7 |
| Example 6 | 8 | 8 | 8 | 8 | 8 | 8 |
| Example 7 | 8 | 8 | 8 | 8 | 8 | 8 |
| Example 8 | 8 | 8 | 8 | 8 | 8 | 8 |
| Example 9 | 8 | 8 | 8 | 8 | 8 | 8 |
| Example 10 | 8 | 8 | 8 | 7 | 7 | 7 |
| Example 11 | 8 | 8 | 8 | 7 | 7 | 7 |
| Example 12 | 8 | 8 | 8 | 8 | 8 | 8 |
| Example 13 | 8 | 8 | 8 | 8 | 8 | 8 |
| Example 14 | 8 | 8 | 8 | 8 | 8 | 8 |
| Example 15 | 8 | 8 | 7 | 7 | 7 | 7 |
| Example 16 | 8 | 8 | 8 | 8 | 8 | 8 |
| Example 17 | 8 | 8 | 7 | 7 | 7 | 7 |
| Example 18 | 8 | 8 | 8 | 8 | 8 | 8 |
| Example 19 | 8 | 8 | 7 | 7 | 7 | 7 |
| Example 20 | 8 | 8 | 8 | 8 | 8 | 8 |
| Example 21 | 8 | 8 | 8 | 8 | 8 | 8 |
| Example 22 | 8 | 8 | 7 | 7 | 7 | 7 |
| Example 23 | 8 | 8 | 8 | 8 | 8 | 8 |
| Example 24 | 8 | 8 | 7 | 7 | 7 | 7 |
| Example 25 | 9 | 9 | 9 | 9 | 9 | 9 |
| Example 26 | 9 | 9 | 9 | 9 | 9 | 9 |
| Example 27 | 9 | 9 | 9 | 9 | 9 | 9 |
| Example 28 | 9 | 9 | 8 | 8 | 8 | 8 |
| Example 29 | 9 | 9 | 8 | 8 | 8 | 8 |
| Example 30 | 9 | 9 | 8 | 8 | 8 | 8 |
| Example 31 | 9 | 9 | 8 | 8 | 8 | 8 |
| Example 32 | 9 | 9 | 9 | 9 | 9 | 9 |
| Example 33 | 9 | 9 | 9 | 9 | 9 | 9 |
| Example 34 | 9 | 9 | 9 | 9 | 9 | 9 |
| Example 35 | 9 | 9 | 9 | 9 | 9 | 9 |
| Example 36 | 9 | 9 | 8 | 8 | 8 | 8 |
| Example 37 | 9 | 9 | 8 | 8 | 8 | 8 |
| Example 38 | 9 | 9 | 8 | 8 | 8 | 8 |
| Example 39 | 9 | 9 | 8 | 8 | 8 | 8 |
| Example 40 | 9 | 9 | 9 | 9 | 9 | 9 |
| Example 41 | 9 | 9 | 9 | 9 | 9 | 9 |
| Example 42 | 9 | 9 | 9 | 9 | 9 | 9 |
| Example 43 | 9 | 9 | 8 | 8 | 8 | 8 |
| Example 44 | 9 | 9 | 9 | 9 | 9 | 9 |
| Example 45 | 9 | 9 | 9 | 9 | 9 | 9 |

TABLE 4-3

|  | Particle number | Percentage biodegradability (%) of the particles | Coating unevenness | | | | |
|---|---|---|---|---|---|---|---|
|  |  |  | Particles | Liquid foundation | Milky lotion | Loose powder | Powder foundation |
| Example 46 | PCT-46 | 79 | 9 | 10 | 10 | 9 | 9 |
| Example 47 | PCT-47 | 81 | 9 | 10 | 10 | 9 | 9 |
| Example 48 | PCT-48 | 78 | 9 | 10 | 10 | 9 | 9 |
| Example 49 | PCT-49 | 79 | 9 | 10 | 10 | 9 | 9 |
| Example 50 | PCT-50 | 76 | 9 | 10 | 10 | 9 | 9 |
| Example 51 | PCT-51 | 78 | 9 | 10 | 10 | 9 | 9 |
| Example 52 | PCT-52 | 81 | 9 | 10 | 10 | 9 | 9 |
| Example 53 | PCT-53 | 75 | 8 | 9 | 9 | 8 | 8 |
| Example 54 | PCT-54 | 81 | 9 | 10 | 10 | 9 | 9 |
| Example 55 | PCT-55 | 74 | 8 | 9 | 9 | 8 | 8 |
| Example 56 | PCT-56 | 79 | 9 | 10 | 10 | 9 | 9 |
| Example 57 | PCT-57 | 80 | 9 | 10 | 10 | 9 | 9 |
| Example 58 | PCT-58 | 81 | 9 | 10 | 10 | 9 | 9 |
| Example 58 | PCT-59 | 80 | 9 | 10 | 10 | 9 | 9 |
| Example 59 | PCT-60 | 79 | 9 | 10 | 10 | 9 | 9 |
| Example 60 | PCT-61 | 81 | 9 | 10 | 10 | 9 | 9 |
| Example 61 | PCT-62 | 80 | 9 | 10 | 10 | 9 | 9 |
| Example 62 | PCT-63 | 79 | 9 | 10 | 10 | 9 | 9 |
| Example 63 | PCT-64 | 80 | 9 | 10 | 10 | 9 | 9 |
| Example 64 | PCT-65 | 81 | 9 | 10 | 10 | 9 | 9 |
| Example 65 | PCT-66 | 80 | 9 | 10 | 10 | 9 | 9 |
| Example 66 | PCT-67 | 79 | 9 | 10 | 10 | 9 | 9 |
| Example 67 | PCT-68 | 80 |  |  |  |  |  |
| Example 68 | PCT-69 | 73 | 8 | 9 | 9 | 8 | 8 |
| Example 69 | PCT-70 | 74 | 8 | 9 | 9 | 8 | 8 |
| Example 70 | PCT-71 | 79 | 9 | 10 | 10 | 9 | 9 |
| Example 71 | PCT-72 | 80 | 9 | 10 | 10 | 9 | 9 |
| Example 73 | PCT-73 | 71 | 10 | 10 | 10 | 10 | 10 |
| Example 74 | PCT-74 | 71 | 10 | 10 | 10 | 10 | 10 |
| Example 75 | PCT-75 | 70 | 10 | 10 | 10 | 10 | 10 |
| Example 76 | PCT-76 | 71 | 10 | 10 | 10 | 10 | 10 |
| Example 77 | PCT-79 | 94 | 7 | 8 | 8 | 7 | 7 |
| Example 78 | PCT-80 | 95 | 7 | 8 | 8 | 7 | 7 |
| Example 79 | PCT-81 | 93 | 7 | 8 | 8 | 7 | 7 |
| Example 80 | PCT-82 | 93 | 7 | 8 | 8 | 7 | 7 |
| Example 81 | PCT-85 | 86 | 8 | 9 | 9 | 8 | 8 |
| Example 82 | PCT-86 | 85 | 8 | 9 | 9 | 8 | 8 |
| Example 83 | PCT-87 | 82 | 8 | 9 | 9 | 8 | 8 |
| Example 84 | PCT-88 | 84 | 8 | 9 | 9 | 8 | 8 |
| Comparative Example 1 | PCT-77 | 95 | 5 | 5 | 5 | 5 | 5 |
| Comparative Example 2 | PCT-78 | 96 | 5 | 5 | 5 | 5 | 5 |
| Comparative Example 3 | PCT-83 | 85 | 5 | 6 | 6 | 5 | 5 |
| Comparative Example 4 | PCT-84 | 84 | 5 | 6 | 6 | 5 | 5 |
| Comparative Example 5 | PTC-101 | 79 | 5 | 5 | 5 | 5 | 5 |
| Comparative Example 6 | PTC-102 | 78 | 5 | 5 | 5 | 5 | 5 |
| Comparative Example 7 | PTC-103 | 17 | 6 | 6 | 6 | 6 | 6 |
| Comparative Example 8 | PTC-104 | 25 | 6 | 6 | 6 | 6 | 6 |
| Comparative Example 9 | PTC-105 | 24 | 6 | 6 | 6 | 6 | 6 |
| Comparative Example 10 | PTC-111 | 85 | 6 | 6 | 6 | 6 | 6 |
| Comparative Example 11 | PTC-112 | 88 | 6 | 6 | 6 | 6 | 6 |

TABLE 4-4

|  | Coating unevenness | | | | | |
|---|---|---|---|---|---|---|
|  | Sunscreen cream | All-in-one gel | Foundation primer | Lip primer | Body powder | Solid powder eyeshadow |
| Example 46 | 10 | 10 | 9 | 9 | 9 | 9 |
| Example 47 | 10 | 10 | 9 | 9 | 9 | 9 |
| Example 48 | 10 | 10 | 9 | 9 | 9 | 9 |
| Example 49 | 10 | 10 | 9 | 9 | 9 | 9 |
| Example 50 | 10 | 10 | 9 | 9 | 9 | 9 |
| Example 51 | 10 | 10 | 9 | 9 | 9 | 9 |
| Example 52 | 10 | 10 | 9 | 9 | 9 | 9 |
| Example 53 | 9 | 9 | 8 | 8 | 8 | 8 |
| Example 54 | 10 | 10 | 9 | 9 | 9 | 9 |
| Example 55 | 9 | 9 | 8 | 8 | 8 | 8 |
| Example 56 | 10 | 10 | 9 | 9 | 9 | 9 |
| Example 57 | 10 | 10 | 9 | 9 | 9 | 9 |
| Example 58 | 10 | 10 | 9 | 9 | 9 | 9 |

TABLE 4-4-continued

|  | Coating unevenness | | | | | |
|---|---|---|---|---|---|---|
|  | Sunscreen cream | All-in-one gel | Foundation primer | Lip primer | Body powder | Solid powder eyeshadow |
| Example 58 | 10 | 10 | 9 | 9 | 9 | 9 |
| Example 59 | 10 | 10 | 0 | 9 | 9 | 9 |
| Example 60 | 10 | 10 | 9 | 9 | 9 | 9 |
| Example 61 | 10 | 10 | 9 | 9 | 9 | 9 |
| Example 62 | 10 | 10 | 9 | 9 | 9 | 9 |
| Example 63 | 10 | 10 | 9 | 9 | 9 | 9 |
| Example 64 | 10 | 10 | 9 | 9 | 9 | 9 |
| Example 65 | 10 | 10 | 9 | 9 | 9 | 9 |
| Example 66 | 10 | 10 | 9 | 9 | 9 | 9 |
| Example 67 |  |  |  |  |  |  |
| Example 68 | 9 | 9 | 8 | 8 | 8 | 8 |
| Example 69 | 9 | 9 | 8 | 8 | 8 | 8 |
| Example 70 | 10 | 10 | 9 | 9 | 9 | 9 |
| Example 71 | 10 | 10 | 9 | 9 | 9 | 9 |
| Example 73 | 10 | 10 | 10 | 10 | 10 | 10 |
| Example 74 | 10 | 10 | 10 | 10 | 10 | 10 |
| Example 75 | 10 | 10 | 10 | 10 | 10 | 10 |
| Example 76 | 10 | 10 | 10 | 10 | 10 | 10 |
| Example 77 | 8 | 8 | 7 | 7 | 7 | 7 |
| Example 78 | 8 | 8 | 7 | 7 | 7 | 7 |
| Example 79 | 8 | 8 | 7 | 7 | 7 | 7 |
| Example 80 | 8 | 8 | 7 | 7 | 7 | 7 |
| Example 81 | 9 | 9 | 8 | 8 | 8 | 8 |
| Example 82 | 9 | 9 | 8 | 8 | 8 | 8 |
| Example 83 | 9 | 9 | 8 | 8 | 8 | 8 |
| Example 84 | 9 | 9 | 8 | 8 | 8 | 8 |
| Comparative Example 1 | 5 | 5 | 5 | 5 | 5 | 5 |
| Comparative Example 2 | 5 | 5 | 5 | 5 | 5 | 5 |
| Comparative Example 3 | 6 | 6 | 5 | 5 | 5 | 5 |
| Comparative Example 4 | 6 | 6 | 5 | 5 | 5 | 5 |
| Comparative Example 5 | 5 | 5 | 5 | 5 | 5 | 5 |
| Comparative Example 6 | 5 | 5 | 5 | 5 | 5 | 5 |
| Comparative Example 7 | 6 | 6 | 6 | 6 | 6 | 6 |
| Comparative Example 8 | 6 | 6 | 6 | 6 | 6 | 6 |
| Comparative Example 9 | 6 | 6 | 6 | 6 | 6 | 6 |
| Comparative Example 10 | 6 | 6 | 6 | 6 | 6 | 6 |
| Comparative Example 11 | 6 | 6 | 6 | 6 | 6 | 6 |

From these results, it can be seen that the cosmetics of the Examples, compared with the cosmetics of the Comparative Examples, may achieve reduced coating unevenness. From this, it can be seen that the cellulosic particles of the Examples may exhibit high dispersibility in a dispersion containing the cellulosic particles.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))
A cellulosic particle containing:
cellulose as a base constituent, wherein:
an intensity of sodium fluorescent x-rays measured by x-ray fluorescence analysis is 0.015 kps or more and 0.1 kps or less.

(((2)))
The cellulosic particle according to (((1))), wherein:
an intensity of chlorine fluorescent x-rays measured by x-ray fluorescence analysis is 0.003 kps or more and 0.08 kps or less.

(((3)))
The cellulosic particle according to (((1))) or (((2))), wherein:
an intensity of sulfur fluorescent x-rays measured by x-ray fluorescence analysis is 0.01 kps or more and 0.05 kps or less.

(((4)))
The cellulosic particle according to any one of (((1))) to (((3))), wherein:
an intensity of calcium fluorescent x-rays measured by x-ray fluorescence analysis is 2 kps or more and 30 kps or less.

(((5)))
The cellulosic particle according to any one of (((1))) to (((4))), wherein: the cellulosic particle has:
a core particle containing the cellulose as a base constituent; and
a coating layer covering the core particle and containing at least one selected from the group consisting of a fatty acid, a fatty acid metallic salt, and an amino acid compound.

(((6)))
The cellulosic particle according to (((5))), wherein:
the fatty acid is a fatty acid having 16 or more and 22 or fewer carbon atoms; and
a number of carbon atoms in the fatty acid metallic salt is 16 or more and 22 or fewer.
(((7)))
The cellulosic particle according to (((5))) or (((6))), wherein:
the fatty acid is a saturated fatty acid; and
the fatty acid metallic salt is a saturated fatty acid metallic salt.
(((8)))
The cellulosic particle according to any one of (((5))) to (((7))), wherein:
the cellulosic particle has an intermediate layer between the core particle and the coating layer; and
the intermediate layer is at least one selected from the group consisting of a polyamine compound, a polyquaternium, a polysaccharide compound, and a polyacrylic acid.
(((9)))
The cellulosic particle according to any one of (((1))) to (((8))), wherein:
the cellulosic particle has an inorganic particle as an external additive.
(((10)))
The cellulosic particle according to any one of (((1))) to (((9))), wherein:
a volume-average particle diameter of the cellulosic particles is 3 μm or more and less than 10 μm.
(((11)))
The cellulosic particle according to any one of (((1))) to (((10))), wherein:
an upper geometric standard deviation by number GSDv of the cellulosic particles is 1.0 or greater and 1.7 or less.
(((12)))
The cellulosic particle according to any one of (((1))) to (((11))), wherein:
sphericity of the cellulosic particle is 0.7 or greater.
(((13)))
The cellulosic particle according to any one of (((1))) to (((12))), wherein:
surface smoothness of the cellulosic particle is 50% or more.
(((14)))
The cellulosic particle according to any one of (((1))) to (((13))), wherein:
a number-average molecular weight of the cellulose is 37000 or more.
(((15)))
The cellulosic particle according to (((14))), wherein:
the number-average molecular weight of the cellulose is 45000 or more.

What is claimed is:
1. A cellulosic particle comprising:
a core particle containing cellulose as a base constituent;
a coating layer covering the core particle and containing at least one selected from the group consisting of a fatty acid and a fatty acid metallic salt; and
an intermediate layer between the core particle and the coating layer, wherein
the fatty acid is a saturated fatty acid,
the fatty acid metallic salt is a saturated fatty acid metallic salt,
the intermediate layer is at least one selected from the group consisting of a polyamine compound, a polyquaternium, a polysaccharide compound, and a polyacrylic acid, and
an intensity of sodium fluorescent x-rays measured by x-ray fluorescence analysis is 0.015 kps or more and 0.1 kps or less.
2. The cellulosic particle according to claim 1, wherein:
an intensity of chlorine fluorescent x-rays measured by x-ray fluorescence analysis is 0.003 kps or more and 0.08 kps or less.
3. The cellulosic particle according to claim 1, wherein:
an intensity of sulfur fluorescent x-rays measured by x-ray fluorescence analysis is 0.01 kps or more and 0.05 kps or less.
4. The cellulosic particle according to claim 1, wherein:
an intensity of calcium fluorescent x-rays measured by x-ray fluorescence analysis is 2 kps or more and 30 kps or less.
5. The cellulosic particle according to claim 1, wherein:
the fatty acid is a fatty acid having 16 or more and 22 or fewer carbon atoms; and
a number of carbon atoms in the fatty acid metallic salt is 16 or more and 22 or fewer.
6. The cellulosic particle according to claim 1, wherein:
the cellulosic particle has an inorganic particle as an external additive.
7. The cellulosic particle according to claim 1, wherein:
a volume-average particle diameter of the cellulosic particles is 3 μm or more and less than 10 μm.
8. The cellulosic particle according to claim 1, wherein:
an upper geometric standard deviation by number GSDv of the cellulosic particles is 1.0 or greater and 1.7 or less.
9. The cellulosic particle according to claim 1, wherein:
sphericity of the cellulosic particle is 0.7 or greater.
10. The cellulosic particle according to claim 1, wherein:
surface smoothness of the cellulosic particle is 50% or more.
11. The cellulosic particle according to claim 1, wherein:
a number-average molecular weight of the cellulose is 37000 or more.
12. The cellulosic particle according to claim 11, wherein:
the number-average molecular weight of the cellulose is 45000 or more.

* * * * *